(12) United States Patent
Yoo

(10) Patent No.: US 11,749,884 B2
(45) Date of Patent: Sep. 5, 2023

(54) MULTI-LAYER ANTENNA STRUCTURE SUPPORTING WIDE BAND AND WIDE ANGLE

(71) Applicant: HJWAVE Co., Ltd., Incheon (KR)

(72) Inventor: Tae Hwan Yoo, Incheon (KR)

(*) Notice: Subject to any disclaimer, the term of this patent is extended or adjusted under 35 U.S.C. 154(b) by 0 days.

(21) Appl. No.: 17/741,225

(22) Filed: May 10, 2022

(65) Prior Publication Data

US 2022/0368011 A1 Nov. 17, 2022

(30) Foreign Application Priority Data

May 17, 2021 (KR) .................... 10-2021-0063506
May 17, 2021 (KR) .................... 10-2021-0063674
(Continued)

(51) Int. Cl.
*H01Q 1/38* (2006.01)
*H01Q 13/10* (2006.01)
(Continued)

(52) U.S. Cl.
CPC ............ *H01Q 1/422* (2013.01); *H01Q 5/371* (2015.01); *H01Q 13/12* (2013.01); *H01Q 13/18* (2013.01); *H01Q 13/22* (2013.01)

(58) Field of Classification Search
CPC .... H01Q 21/005; H01Q 1/243; H01Q 1/3233; H01Q 3/12; H01Q 15/0073; H01Q 13/22;
(Continued)

(56) References Cited

U.S. PATENT DOCUMENTS 9,865,935 B2 * 1/2018 Miraftab ............. H01Q 21/005
10,186,787 B1 * 1/2019 Wang .................. H01Q 21/005
(Continued)

FOREIGN PATENT DOCUMENTS

EP    2249437 A1    11/2010
EP    2945222 A1 *  11/2015    ............ H01P 1/2005
(Continued)

OTHER PUBLICATIONS

English Abstract of JPS62-210704.
(Continued)

*Primary Examiner* — Vibol Tan
(74) *Attorney, Agent, or Firm* — ANTONIO HA & U.S. PATENT, LLC

(57) ABSTRACT

According to an embodiment, a multi-layer antenna structure comprises a printed circuit board including an IC for processing an RF signal, a feeding line connected to the IC, and a feeding pad connected to the feeding line, a conductive lower layer tightly contacting the printed circuit board and including a feeding hole in an area connected with the feeding pad and vertically open and a waveguide connected to the feeding hole and disposed on an upper surface thereof, and a conductive upper layer tightly contacting the conductive lower layer and including an antenna slot pattern in an area corresponding to the waveguide and vertically open. The waveguide may include a bottom surface positioned lower than an upper surface thereof, a side surface extending from each of two opposite ends of the bottom surface to the upper surface, and a protrusion protruding upward from a center portion of the bottom surface.

11 Claims, 23 Drawing Sheets

(30) Foreign Application Priority Data

Jul. 30, 2021 (KR) .......................... 10-2021-0100845
Nov. 2, 2021 (KR) .......................... 10-2021-0148966

(51) Int. Cl.
  *H01Q 1/42* (2006.01)
  *H01Q 5/371* (2015.01)
  *H01Q 13/18* (2006.01)
  *H01Q 13/12* (2006.01)
  *H01Q 13/22* (2006.01)

(58) Field of Classification Search
  CPC .......... H01Q 21/062; H01Q 3/08; H01Q 3/18; H01Q 13/10; H01Q 1/526; H01Q 1/422; H01Q 5/371; H01Q 13/18; H01Q 1/32; H01Q 1/38; H01Q 1/46; H01Q 5/50; H01Q 19/136; H01P 3/121; H01P 1/211; H01P 1/2005; H01P 3/026; G01S 7/03; G01S 13/931; G01S 7/4026
  See application file for complete search history.

(56) References Cited

U.S. PATENT DOCUMENTS

| | | | | |
|---|---|---|---|---|
| 10,256,548 | B2 * | 4/2019 | Stevenson | ............ H01Q 1/3275 |
| 10,944,184 | B2 * | 3/2021 | Shi | ....................... H01Q 21/005 |
| 11,133,594 | B2 * | 9/2021 | Ahmadloo | ............. H01Q 13/18 |
| 11,271,322 | B2 * | 3/2022 | Chan | ..................... H01Q 5/392 |
| 11,515,624 | B2 * | 11/2022 | Kona | ................... H01Q 1/3233 |
| 2006/0132374 | A1 | 6/2006 | Wang | |
| 2018/0351261 | A1 | 12/2018 | Kamo et al. | |
| 2020/0136225 | A1 | 4/2020 | Shi | |
| 2020/0194900 | A1 | 6/2020 | Doyle et al. | |
| 2020/0287293 | A1 | 9/2020 | Shi et al. | |

FOREIGN PATENT DOCUMENTS

| | | | |
|---|---|---|---|
| JP | S62-210704 | 9/1987 | |
| JP | 2002-022822 A | 1/2002 | |
| JP | 2013-066003 A | 4/2013 | |
| KR | 10-0964623 | 6/2010 | |
| KR | 10-1019670 | 3/2011 | |
| KR | 10-2015-0124272 | 11/2015 | |
| KR | 10-2020-0137166 | 12/2020 | |
| WO | WO-2015133454 A1 * | 9/2015 | ............. H01P 5/107 |
| WO | WO-2020162818 A1 * | 8/2020 | ................ H01P 3/00 |
| WO | WO-2021016218 A1 * | 1/2021 | ............... G01S 3/40 |
| WO | WO-2021151538 A1 * | 8/2021 | ............ H01Q 1/526 |

OTHER PUBLICATIONS

English Specification of 10-2015-0124272.
English Specification of EP2249437A1.
English Specification of 10-0964623.
English Specification of JP2002-022822A.
English Specification of JP2013-066003A.
English Specification of 10-1019670.
English Specification of 10-2020-0137166.

* cited by examiner

MULTI-LAYER ANTENNA STRUCTURE SUPPORTING WIDE BAND AND WIDE ANGLE

CROSS-REFERENCE TO RELATED APPLICATIONS

This application is based on and claims priority under 35 U.S.C. 119 to Korean Patent Application Nos. 10-2021-0063506, 10-2021-0063674, 10-2021-0100845, and 10-2021-0148966, respectively filed on May 17, 2021, May 17, 2021, Jul. 30, 2021, and Nov. 2, 2021, in the Korean Intellectual Property Office, the disclosures of which are herein incorporated by reference in their entireties.

TECHNICAL FIELD

The present invention relates to a multi-layer antenna structure supporting a wide band and a wide angle.

DESCRIPTION OF RELATED ART

Corner radars for future vehicles require wide-angle characteristics (e.g., azimuth field of view of 150 degrees or more) for object detection at intersections, a high resolution for detecting small objects, and a wide bandwidth (e.g., a bandwidth of 5 GHz or higher). To meet these requirements, the antenna itself should meet both the wide-angle and wide-band characteristics. However, currently commercially available antennas for vehicles do not meet both the wide-angle and wide-band characteristics but only meet either the wide-angle characteristics or the wide-band characteristics.

The description disclosed in the Background section is only for a better understanding of the background of the invention and may also include information which does not constitute the prior art.

SUMMARY

According to an embodiment, there is provided a multi-layer antenna structure supporting a wide band and a wide angle, capable of meeting both wide-band characteristics and wide-angle characteristics and being adopted for vehicle radars.

According to an embodiment, a multi-layer antenna structure supporting a wide band and a wide angle comprises a printed circuit board including an integrated circuit (IC) for processing a radio frequency (RF) signal, a feeding line connected to the IC, and a feeding pad connected to the feeding line to transfer the RF signal, a conductive lower layer tightly contacting the printed circuit board and including a feeding hole provided in an area connected with the feeding pad of the printed circuit board and vertically open and a waveguide connected to the feeding hole and disposed on an upper surface of the conductive lower layer, and a conductive upper layer tightly contacting the conductive lower layer and including an antenna slot pattern provided in an area corresponding to the waveguide of the conductive lower layer and vertically open to radiate or receive the RF signal. The waveguide of the conductive lower layer may include a bottom surface positioned lower than an upper surface thereof, a side surface extending from each of two opposite ends of the bottom surface to the upper surface, and a protrusion protruding upward from a center portion of the bottom surface.

An overall length along the bottom surface and an outer circumference of the protrusion may be not less than a half wavelength of the RF signal.

A height of the protrusion may be larger than a width of the protrusion and is larger than half of a depth of the side surface.

Each of the conductive upper layer and the conductive lower layer may include an insulating body formed by plastic injection molding and a conductive layer coated on a surface of the insulating body.

The conductive upper layer may be thinner than the conductive lower layer.

The multi-layer antenna structure may further comprise a conductive sub layer interposed between the printed circuit board and the conductive upper layer to provide a path of the RF signal between the feeding pad of the printed circuit board and the feeding hole of the conductive lower layer.

The feeding pad of the printed circuit board and the feeding hole of the conductive lower layer may be elongated in a lengthwise direction of the feeding line of the printed circuit board.

The antenna slot pattern of the conductive upper layer may include at least two rows of slot arrays. The at least two rows of slot arrays may include a first row of slot array and a second row of slot array which have different slot lengths, or slots in the at least two rows of slot arrays are arranged in a zig-zagged pattern.

The antenna slot pattern of the conductive upper layer may include a row of slot array disposed at an upper portion of the conductive lower layer. The conductive upper layer may further include a protruding rib on a side of the row of slot array on the upper surface thereof.

The printed circuit board, the conductive lower layer, and the conductive upper layer may be coupled to each other by fitting a guide protrusion into a guide hole. The printed circuit board, the conductive lower layer, and the conductive upper layer each may include a rivet hole into which a rivet is inserted and be coupled to each other by riveting.

The conductive upper layer may further include an adjacent slot pattern vertically open or cut around the antenna slot pattern.

According to the disclosure, it is possible to provide a horizontal polarization antenna including a protruding waveguide having a protrusion, which may implement both a wide-band characteristic and a wide-angle characteristic appropriate for next-generation vehicle corner radars.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
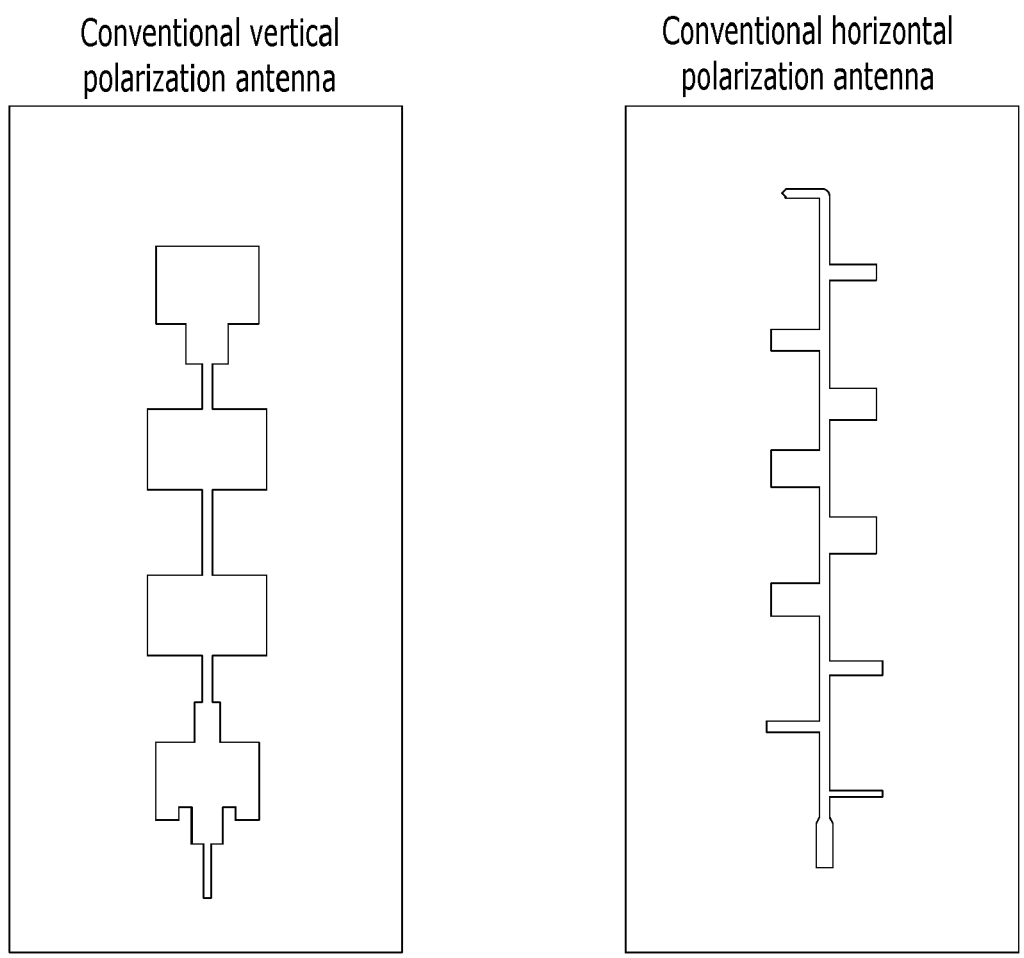
FIG. 1 is a view illustrating a vertical polarization antenna and a horizontal polarization antenna according to the prior art.

Hereinafter, embodiments of the present invention are described in detail with reference to the accompanying drawings.

Embodiments of the disclosure are provided to thoroughly explain the disclosure to those skilled in the art, and various modifications may be made thereto, and the scope of the present invention is not limited thereto. Embodiments of the disclosure are provided to fully and thoroughly convey the spirit of the present invention to those skilled in the art.

As used herein, the thickness and size of each layer may be exaggerated for ease or clarity of description. The same reference denotations may be used to refer to the same or substantially the same elements throughout the specification and the drawings. As used herein, the term "A and/or B" encompasses any, or one or more combinations, of A and B. It will be understood that when an element or layer is referred to as being "on," "connected to," "coupled to," or "adjacent to" another element or layer, it can be directly on, connected, coupled, or adjacent to the other element or layer, or intervening elements or layers may be present.

The terms as used herein are provided merely to describe some embodiments thereof, but not intended as limiting the present invention. As used herein, the singular forms "a," "an," and "the" are intended to include the plural forms as well, unless the context clearly indicates otherwise. As used herein, the term "comprise," "include," and/or "comprising" or "including" does not exclude the presence or addition of one or more other components, steps, operations, and/or elements than the component, step, operation, and/or element already mentioned.

As used herein, the terms "first" and "second" may be used to describe various members, parts, regions, areas, layers, and/or portions, but the members, parts, regions, areas, layers, and/or portions are not limited thereby. These terms are used merely to distinguish one member, part, region, area, layer, or portion from another. Accordingly, the term "first member," "first part," "first region," "first area," "first layer," or "first portion" described herein may denote a "second member," "second part," "second region," "second area," "second layer," or "second portion" without departing from the teachings disclosed herein.

The terms "beneath," "below," "lower," "under," "above," "upper," "on," or other terms to indicate a position or location may be used for a better understanding of the relation between an element or feature and another as shown in the drawings. However, embodiments of the present invention are not limited thereby or thereto. For example, where a lower element or an element positioned under another element is overturned, then the element may be termed as an upper element or element positioned above the other element. Thus, the term "under" or "beneath" may encompass, in meaning, the term "above" or "over."

Figure 2:
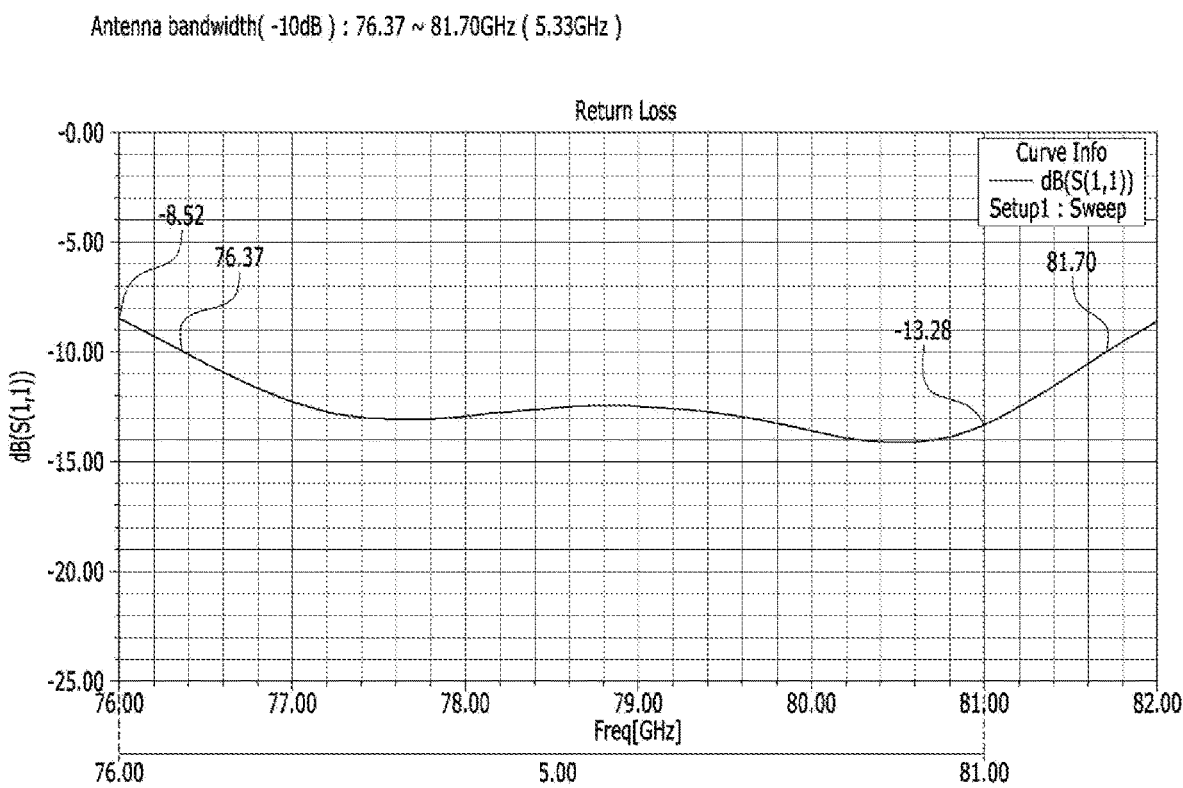
FIG. 2 is a graph illustrating the bandwidth of the vertical polarization antenna of FIG. 1.
Figure 3:
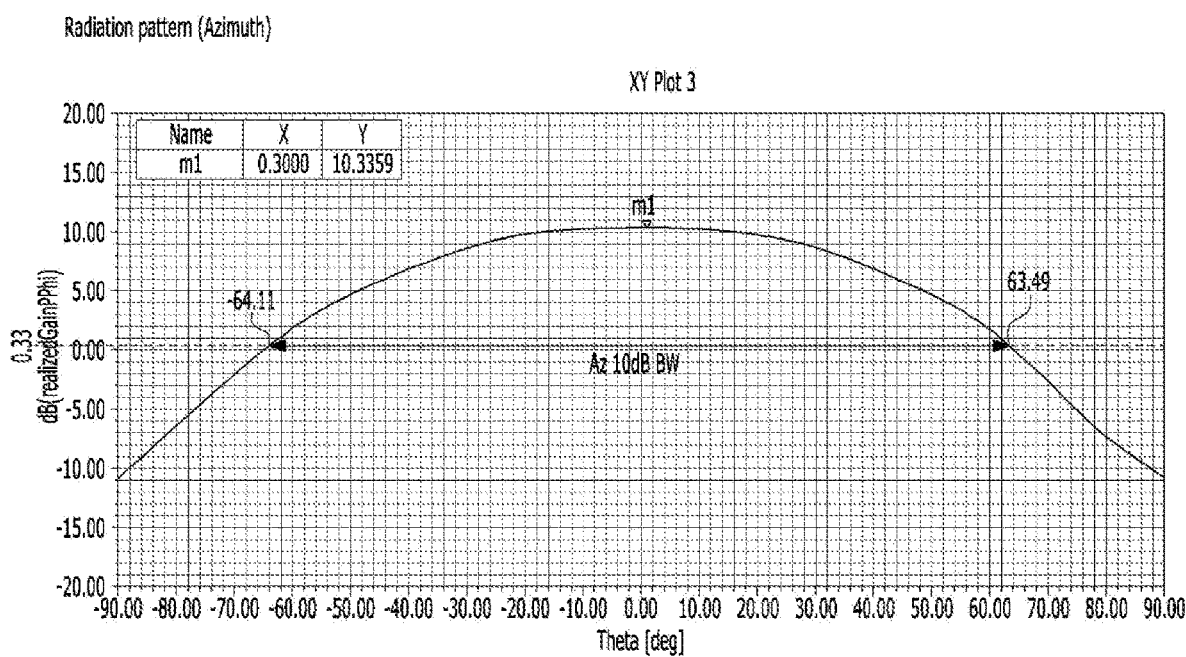
FIG. 3 is a graph illustrating a radiation pattern of the vertical polarization antenna of FIG. 1.
Figure 4:
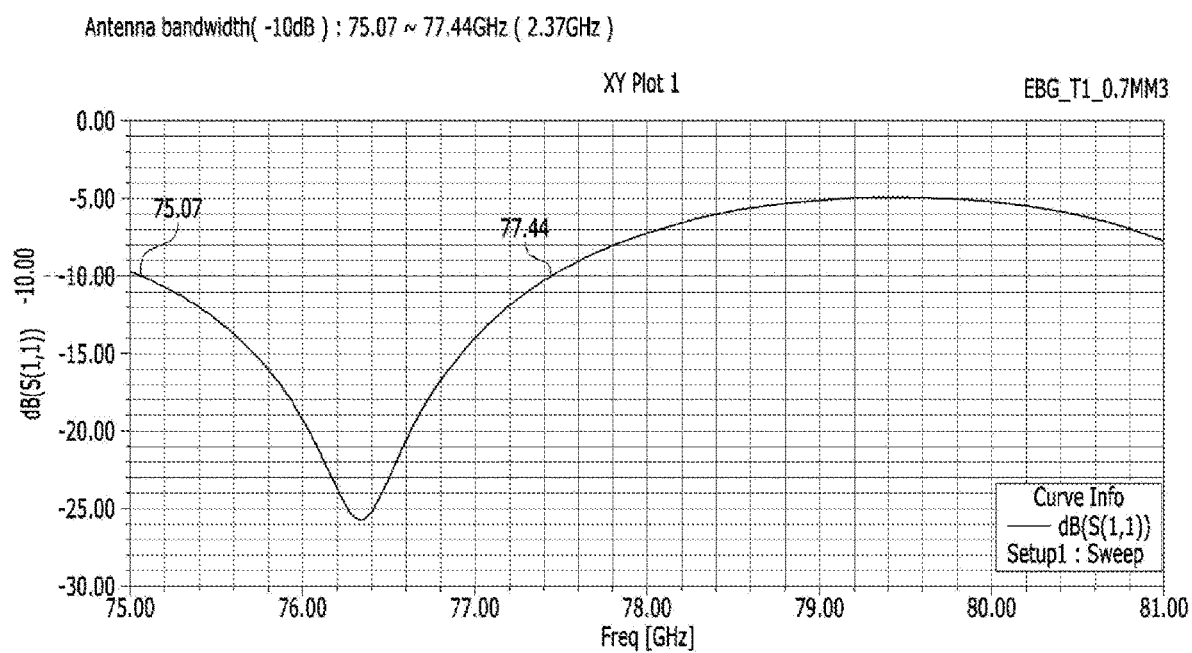
FIG. 4 is a graph illustrating the bandwidth of the horizontal polarization antenna of FIG. 1.
Figure 5:
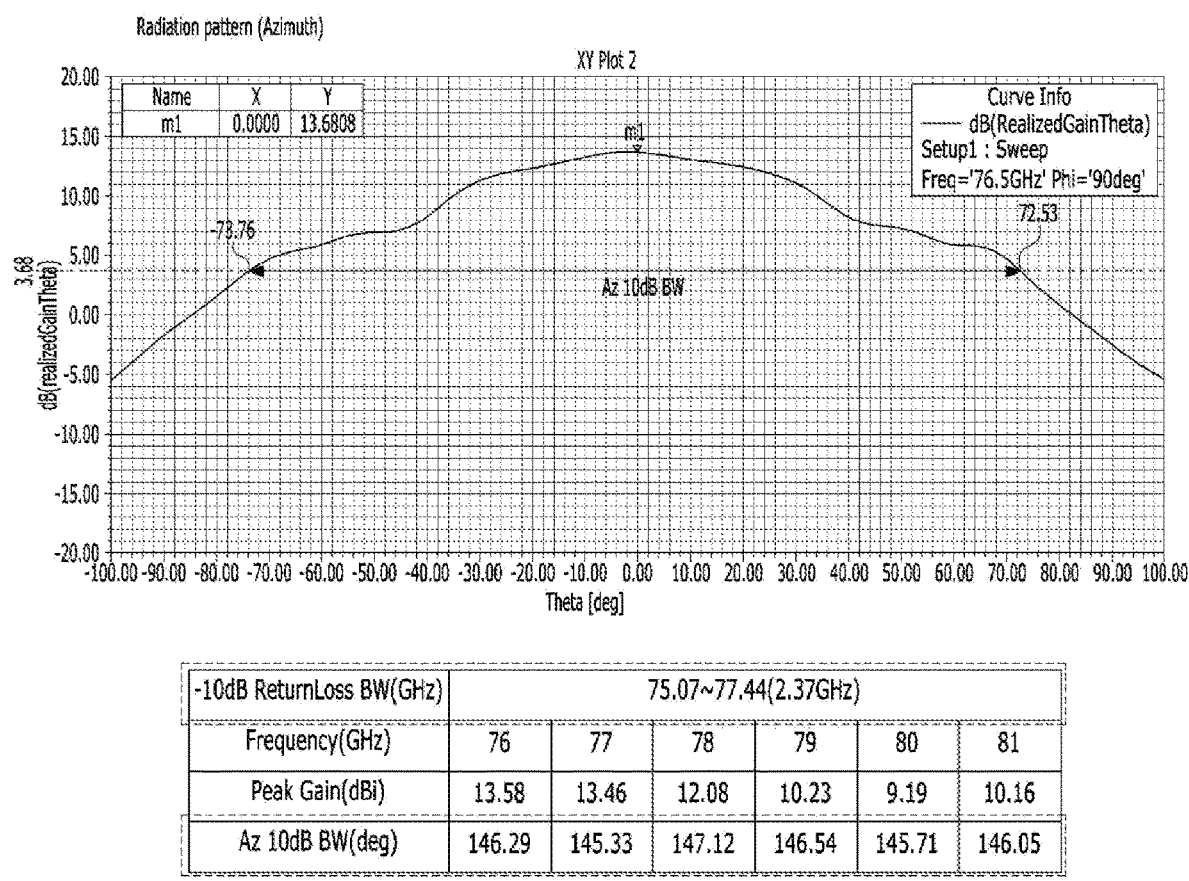
FIG. 5 is a graph illustrating a radiation pattern of the horizontal polarization antenna of FIG. 1.

FIG. 1 is a view illustrating a vertical polarization antenna and a horizontal polarization antenna according to the prior art. FIG. 2 is a graph illustrating the bandwidth of the vertical polarization antenna of FIG. 1. FIG. 3 is a graph illustrating a radiation pattern of the vertical polarization antenna of FIG. 1. FIG. 4 is a graph illustrating the bandwidth of the horizontal polarization antenna of FIG. 1. FIG. 5 is a graph illustrating a radiation pattern of the horizontal polarization antenna of FIG. 1.

Referring to FIGS. 2 and 3, it may be identified that with a conventional serial direct feeding vertical polarization antenna (shown on the left side of FIG. 1), wide-band characteristics may be implemented, but the wide-angle characteristics (150 degrees or more) are not as the AZ 10 dB bandwidth (BW) is about 125 degrees.

It may also be identified from FIGS. 4 and 5 that the conventional serial direct feeding horizontal polarization antenna (shown on the right side of FIG. 1) has about 146 degrees of AZ 10 dB BW, which fails to meet the requirement, 150 degrees, for corner radars, and an antenna bandwidth of about 2.4 GHz, and with it, it is difficult to implement the wide-angle characteristics and wide-band characteristics (requiring 5 GHz or more).

In general, antennas for vehicle corner radars require a wide-angle characteristic of about 150 degrees or more, but conventional vertical/horizontal polarization antennas currently adopted in vehicle radars have difficulty in implementing such wide-angle characteristic.

Figure 6:
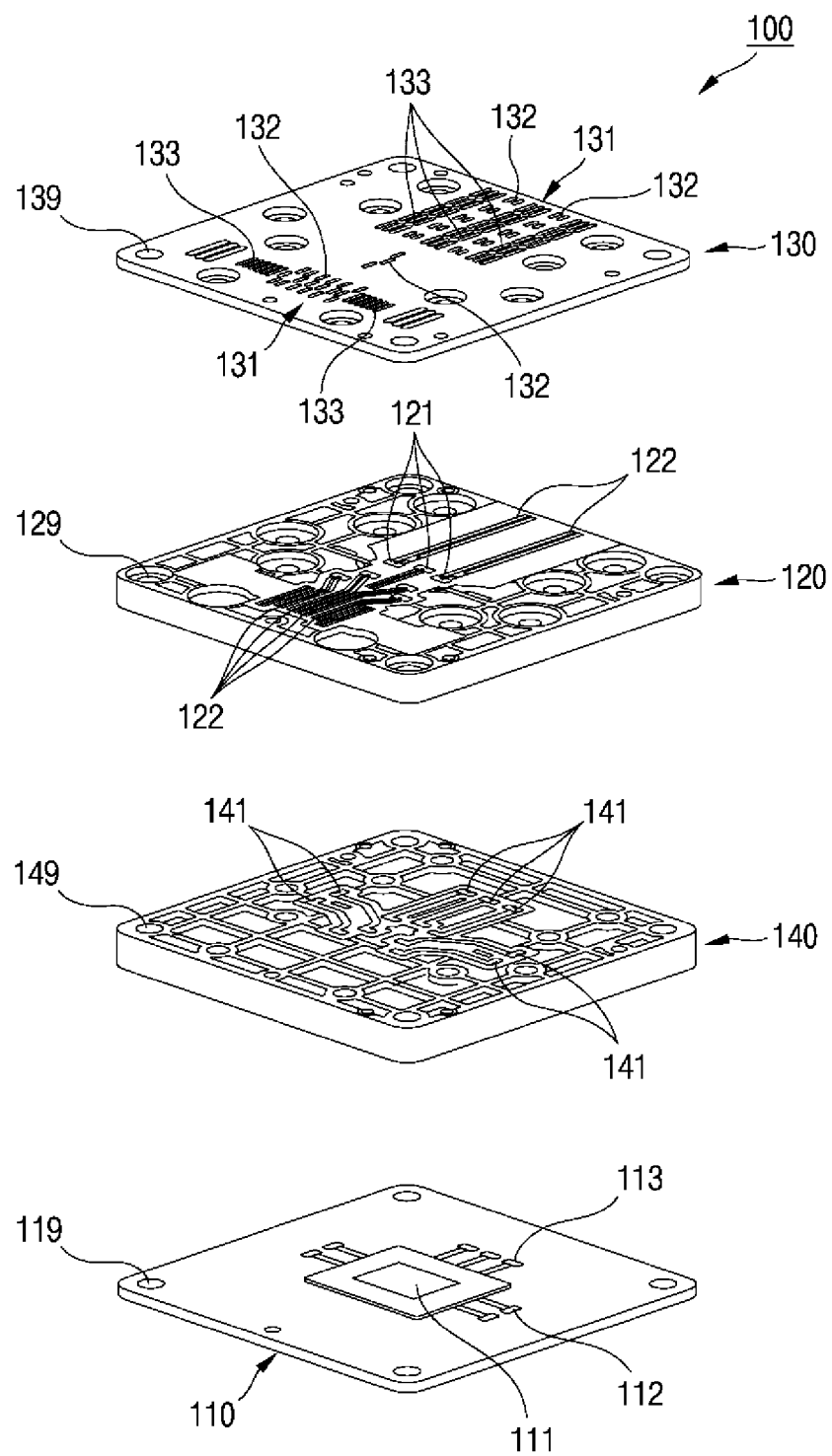
FIG. 6 is a view illustrating an example of a multi-layer antenna structure according to an embodiment.

FIG. 6 is a view illustrating an example of a multi-layer antenna structure 100 according to an embodiment. Referring to FIG. 6, according to an embodiment, a multi-layer antenna structure 100 may include a printed circuit board 110, a conductive lower layer 120, and a conductive upper layer 130. According to an embodiment, the multi-layer antenna structure 100 may further include a conductive sub layer 140.

The printed circuit board 110 may have a substantially flat plate shape and may have an integrated circuit 111 for processing radio frequency (RF) signals thereon. The printed circuit board 110 may include feeding lines 112 electrically connected to the integrated circuit 111 and feeding pads 113 electrically connected to the feeding lines 112 to transmit or receive RF signals. According to an embodiment, the integrated circuit 111, the feeding lines 112, and the feeding pads 113 of the printed circuit board 110 may be coated with a metal. According to an embodiment, an area of the printed circuit board 110, which faces the conductive lower layer 120 and/or the conductive sub layer 140, may be coated with a metal to prevent transmission/reception loss of electromagnetic waves. According to an embodiment, the printed circuit board 110 may further include a plurality of rivet holes 119 for riveting. According to an embodiment, the printed circuit board 110 may include a radar board or may be denoted as a radar board.

The conductive lower layer 120 may have a substantially flat plate shape and may include feeding holes 121, which are provided in areas (where electromagnetic waves may be transmitted/received) connected with the feeding pads 113 of the printed circuit board 110 and are vertically open, and protruding waveguides 122 connected to the feeding holes 121 and disposed on the upper surface of the conductive lower layer 120. According to an embodiment, the protruding waveguide 122 includes a bottom surface 1221, a side surface 1222, and a protrusion 1223. According to an embodiment, at plan view, the feeding hole 121 may be shaped as a rectangle, a rectangle with rounded corners, or an oval, and the waveguide 122 may be shaped as a long straight line or a curved line. According to an embodiment, the conductive lower layer 120 may be brought in tight contact and fixed to the printed circuit board 110 by riveting and, to that end, may include a plurality of rivet holes 129. According to an embodiment, the conductive lower layer 120 may include, or be denoted as, an antenna feeder layer.

The conductive upper layer 130 may have a substantially flat plate shape and may include a plurality of antenna slot patterns 131 provided in areas corresponding to the waveguides 122 of the conductive lower layer 120 and vertically open to radiate or receive RF signals. According to an embodiment, the antenna slot pattern 131 may include a plurality of slots each shaped as a rectangle or a rectangle with rounded corners and arranged in one or more rows and/or a slot array 132. The terms "antenna slot pattern 131," "antenna slot array 132," and "antenna slot" are interchangeably used herein, but all of them are used to refer to elements vertically passing through the conductive upper layer 130.

According to an embodiment, the conductive upper layer 130 may further include adjacent slot patterns 133, which are cut or open vertically, on sides of the slot arrays 132. According to an embodiment, the adjacent slot pattern 133 may include, or be denoted as, an angle error mitigating structure capable of mitigating ripples and angle errors. The angle mitigating structure may mitigate or reduce angle errors to enhance angular resolution in vehicle radars that are used to prevent accident and implement autonomous driving by detecting, e.g., the distance, speed, or angle from an object around the vehicle equipped with the vehicle radar. In other words, the angle error mitigating structure may enhance angle errors in the detected object by mitigating or reducing angle errors to enhance angular resolution.

According to an embodiment, the conductive upper layer 130 may be riveted to the conductive lower layer 120 and/or the printed circuit board 110 to be brought in tight contact with or fixed to the conductive lower layer 120 and/or the printed circuit board 110. To that end, the conductive upper layer 130 may include a plurality of rivet holes 139. According to an embodiment, the conductive upper layer 130 may include, or be denoted as, an antenna slot layer or an antenna radiator.

The optional conductive sub layer 140 may have a substantially flat plate shape and be interposed between the printed circuit board 110 and the conductive lower layer 120 to transition electromagnetic waves between the printed circuit board 110 and the conductive lower layer 120. According to an embodiment, the conductive sub layer 140 may include RF signal paths, e.g., feeding holes 141, provided between the feeding pads 113 of the printed circuit board 110 and the feeding holes 121 of the conductive lower layer 120. At plan view, the RF signal path may be shaped as a rectangle, a rectangle with rounded corners, or an oval. According to an embodiment, the conductive sub layer 140 may include a plurality of rivet holes 149 to be riveted with the conductive lower layer 120, the conductive upper layer 130, and the printed circuit board 110 to be brought in tight contact with or fixed to the conductive lower layer 120, the conductive upper layer 130, and the printed circuit board 110. According to an embodiment, the conductive sub layer 140 may include, or be denoted as, an antenna feeder layer or a printed circuit board connector.

According to an embodiment, the conductive lower layer 120, the conductive upper layer 130, and the conductive sub layer 140 may include an insulating body (not shown), which is be formed or molded by plastic injection molding, and a conductive layer (not shown) coated on the surface of the insulating body. The insulating body may be a thermosetting or thermoplastic resin, and the conductive layer may include at least one or an alloy of copper, gold, platinum, silver, aluminum, or nickel. According to an embodiment, the conductive layer may be formed on any surface, which contacts the external air, such as the upper surface, lower surface, side surface, waveguide, feeding hole, and/or rivet hole, of each of the conductive lower layer 120, the conductive upper layer 130, and the conductive sub layer 140.

Thus, the multi-layer antenna structure 100 according to an embodiment may implement both the wide-angle characteristic/wide-band characteristic appropriate for next-generation vehicle corner radars, and its specific characteristics are described below in greater detail.

Figure 7A:
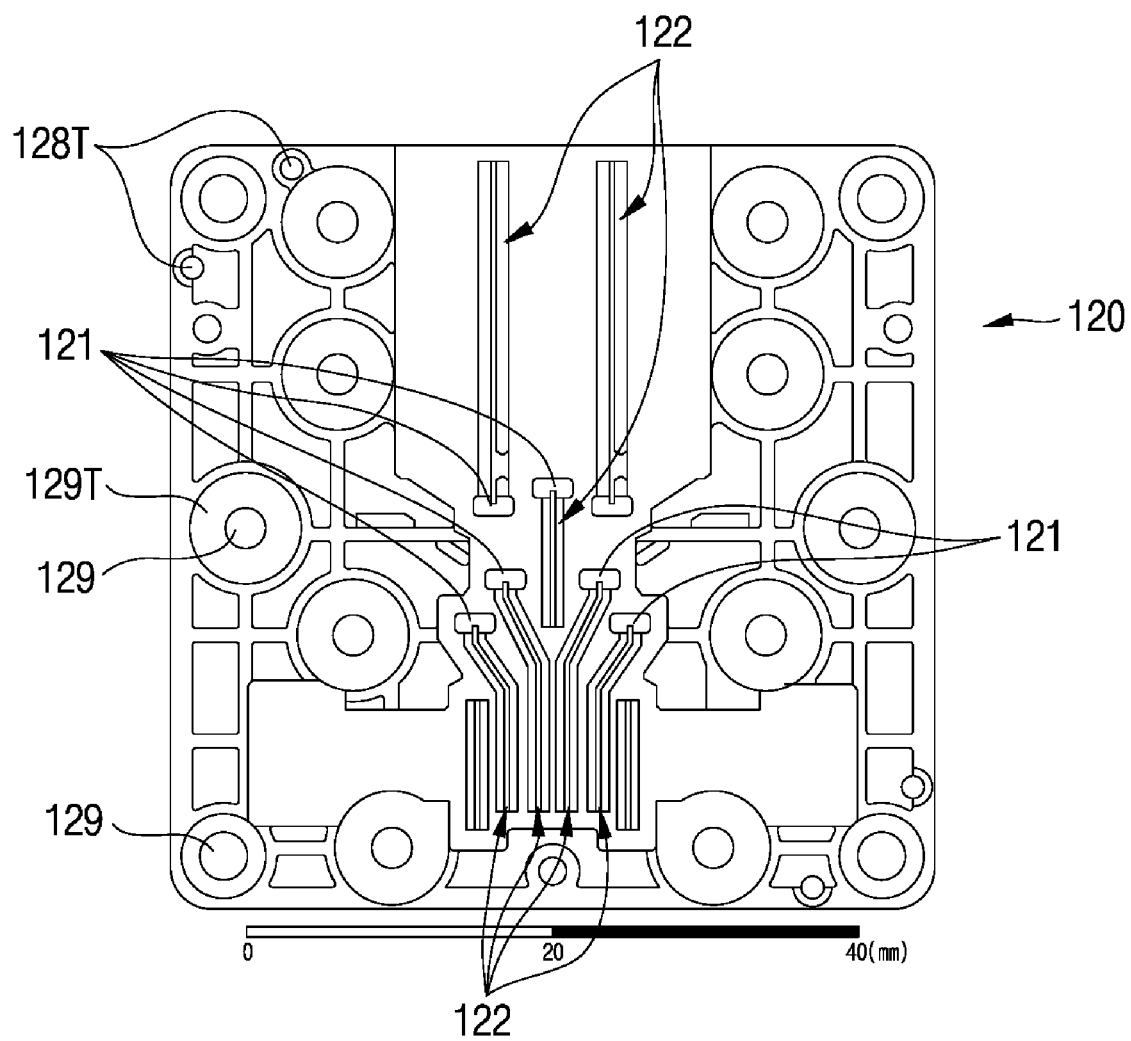
FIGS. 7A and 7B are a top view and bottom view illustrating a conductive lower layer of a multi-layer antenna structure according to an embodiment.
Figure 7B:
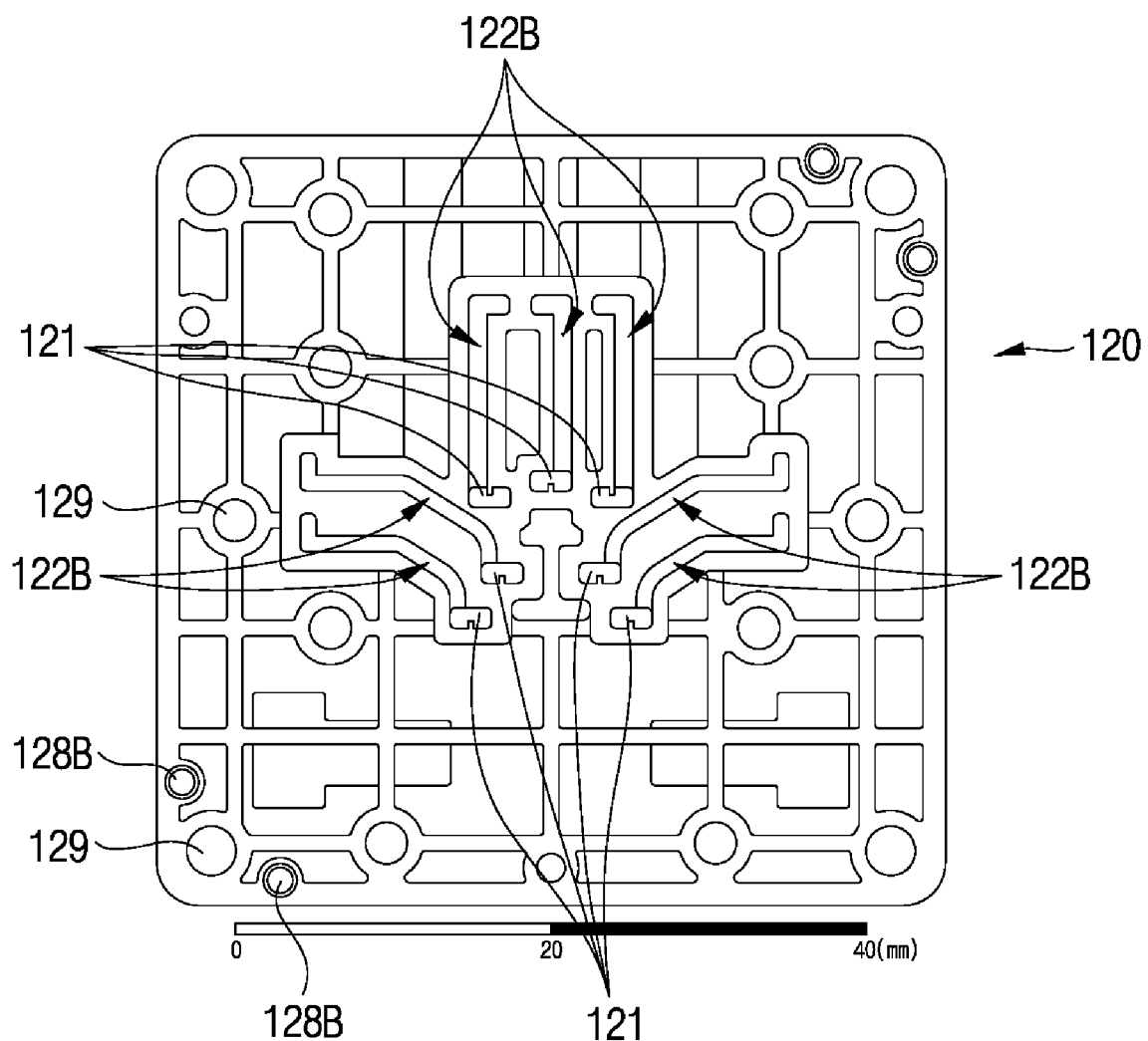

FIGS. 7A and 7B are a top view and bottom view illustrating a conductive lower layer 120 of a multi-layer antenna structure 100 according to an embodiment.

Referring to FIGS. 7A and 7B, according to an embodiment, the conductive lower layer 120 of the multi-layer antenna structure 100 may have a substantially flat upper surface and a substantially flat lower surface and may include waveguides 122 on the upper surface and waveguides 122B on the lower surface. The waveguides 122 on the upper surface and the waveguides 122B on the lower surface may be connected to each other through the feeding holes 121. According to an embodiment, the waveguide 122 on the upper surface of the conductive lower layer 120 may include a bottom surface 1221, which is positioned lower than the upper surface, side surfaces 1222, which are connected from two opposite ends of the bottom surface 1221 to the upper surface, and a protrusion 1223, which projects upward from a center of the bottom surface 1221. According to an embodiment, the waveguide 122B on the lower surface of the conductive lower layer 120 may include no protrusion 1223.

According to an embodiment, two transmission waveguides 122 may be formed in an upper area on the upper surface of the conductive lower layer 120, one transmission waveguide 122 may be formed in a central area on the upper surface of the conductive lower layer 120, and four reception waveguides 122 may be formed in a lower area on the upper surface of the conductive lower layer 120. As described above, the three transmission waveguides 122 and the four reception waveguides 122 all may be protruding waveguides 122 and may have a straight line or curved line shape with a predetermined length.

According to an embodiment, three transmission waveguides 122B may be formed in an upper area on the lower surface of the conductive lower layer 120, and four reception waveguides 122B may be formed in a center area and side areas on the lower surface of the conductive lower layer 120.

As described above, the waveguide 122 on the upper surface may be connected with the waveguide 122B on the lower surface, through the feeding hole 121.

According to an embodiment, the conductive lower layer 120 may include a plurality of rivet holes 129 passing through the upper and lower surfaces thereof. According to an embodiment, the conductive lower layer 120 may include a plurality of guide protrusions 128T formed on the upper surface thereof and a plurality of guide holes 128B passing through the upper and lower surfaces thereof. According to an embodiment, the conductive lower layer 120 may further include guide recesses 129T around the rivet holes 129. The guide recess 129T may be larger in diameter than the rivet hole 129.

The guide protrusion 148T of the conductive sub layer 140 may be fitted into the guide hole 128B of the conductive lower layer 120, the guide protrusion 128T of the conductive lower layer 120 may be fitted into the guide hole 138B of the conductive upper layer 130, and the guide protrusion 148T of the conductive upper layer 130 may be fitted into the guide recess 129T of the conductive lower layer 120.

Figure 8A:
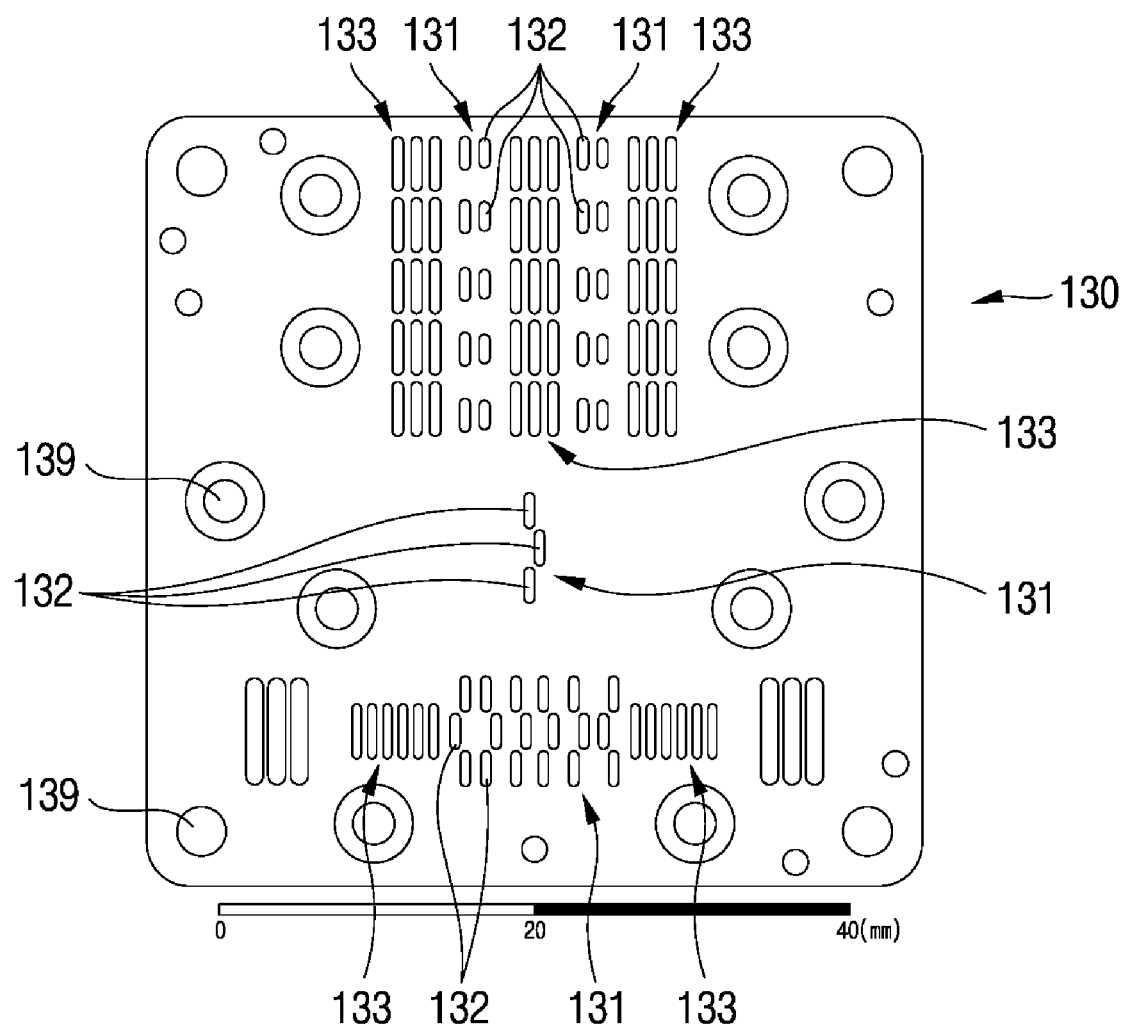
FIGS. 8A and 8B are a top view and bottom view illustrating a conductive upper layer of a multi-layer antenna structure according to an embodiment.
Figure 8B:
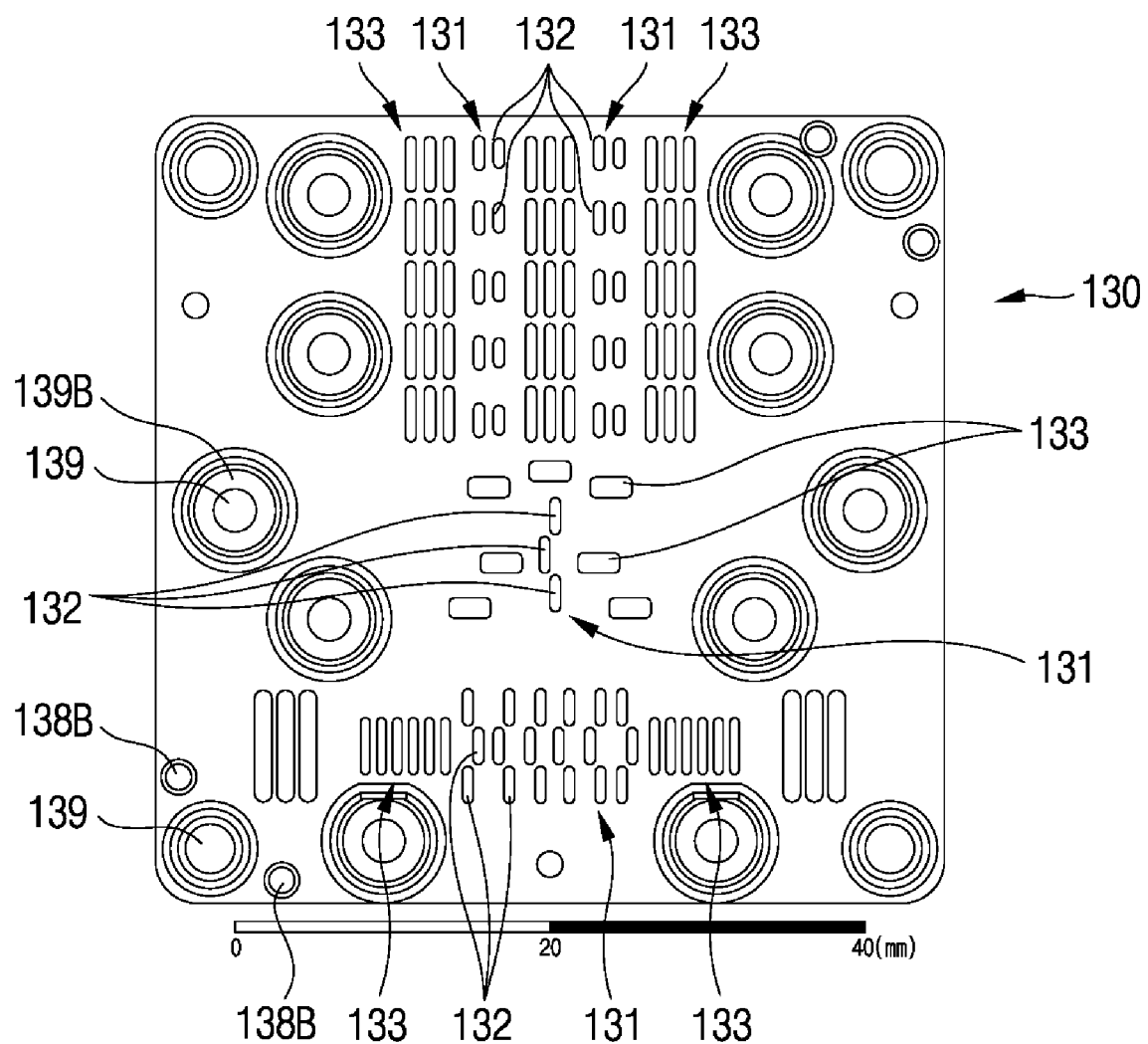

FIGS. 8A and 8B are a top view and bottom view illustrating a conductive upper layer 130 of a multi-layer antenna structure 100 according to an embodiment.

Referring to FIGS. 8A and 8B, according to an embodiment, the conductive upper layer 130 of the multi-layer antenna structure 100 may have a substantially flat upper surface and a substantially flat lower surface and may include a plurality of antenna slot patterns 131 and/or a plurality of antenna slot arrays 132 vertically passing through the upper surface and lower surface thereof.

According to an embodiment, the antenna slot pattern 131 may include two slot arrays 132 arranged in two rows, in an upper area of the conductive upper layer 130 and one slot array 132 arranged in one row, in a center area of the conductive upper layer 130. According to an embodiment, the two slot arrays 132 and one slot array 132 each may be formed in an area corresponding to the protruding waveguide 122 formed on the conductive lower layer 120.

According to an embodiment, the conductive upper layer 130 may further include adjacent slot patterns, which are formed by vertically cutting or passing through the conductive upper layer 130, between the two slot arrays 132 and on the respective outer sides of the two slot arrays 132. According to an embodiment, the adjacent slot pattern 133 may include or, be denoted as, an angle error mitigating structure, and may mitigate ripples or angle errors. According to an embodiment, the conductive upper layer 130 may further include one zig-zagged slot array 132 and adjacent slot patterns 133 on the outer sides of the zig-zagged slot array 132 on the lower surface of the conductive upper layer 130 as shown in FIG. 8B.

According to an embodiment, the slots in the two rows of slot arrays 132 may have different lengths. It is possible to enhance the beam tilting performance by forming the slots in the two rows of slot arrays 132 to have different lengths.

According to an embodiment, the antenna slot pattern 131 may further include a plurality of slot arrays 132 arranged in multiple rows in a lower area of the conductive upper layer 130.

According to an embodiment, the plurality of slot arrays 132 each may be formed in an area corresponding to the protruding waveguide 122 formed in the conductive lower layer 120.

According to an embodiment, the plurality of slot arrays 132 arranged in the multiple rows may be arranged in a zig-zagged pattern. For example, the slots arranged in the zig-zagged pattern may have the same length.

According to an embodiment, the conductive upper layer 130 may further include adjacent slot patterns 133, which are formed by vertically cutting or passing through the conductive upper layer 130, on the respective outer sides of the multiple slot arrays 132.

According to an embodiment, the conductive upper layer 130 may be thinner than the conductive lower layer 120. The conductive upper layer 130 may be formed to cover the conductive lower layer 120.

The conductive upper layer 130 may include a plurality of rivet holes 139 and may further include guide holes 138B into which the guide protrusions 128T of the conductive lower layer 120 are fitted and guide protrusions 139B fitted into the guide recesses 129T of the conductive lower layer 120.

Figure 9A:
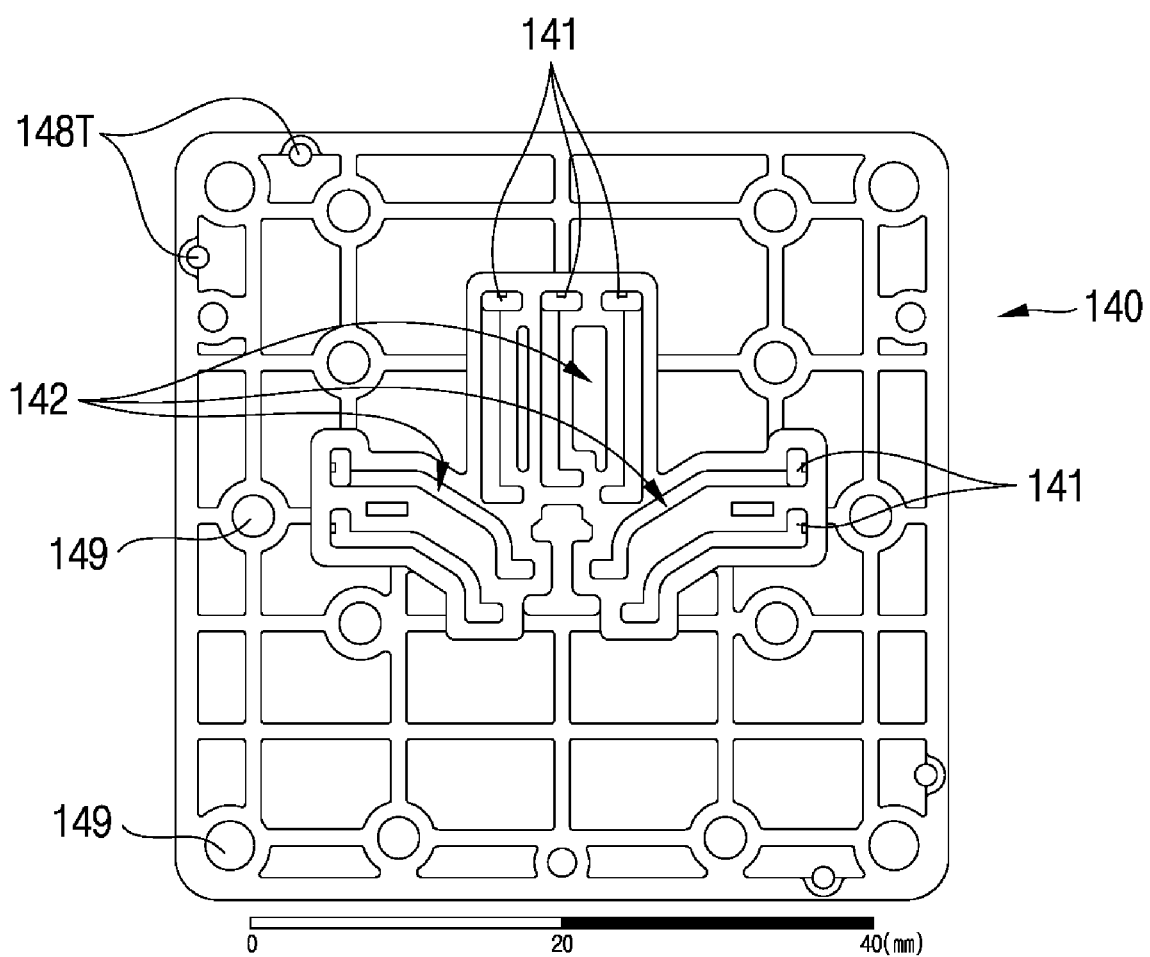
FIGS. 9A and 9B are a top view and bottom view illustrating a conductive sub layer of a multi-layer antenna structure according to an embodiment.
Figure 9B:
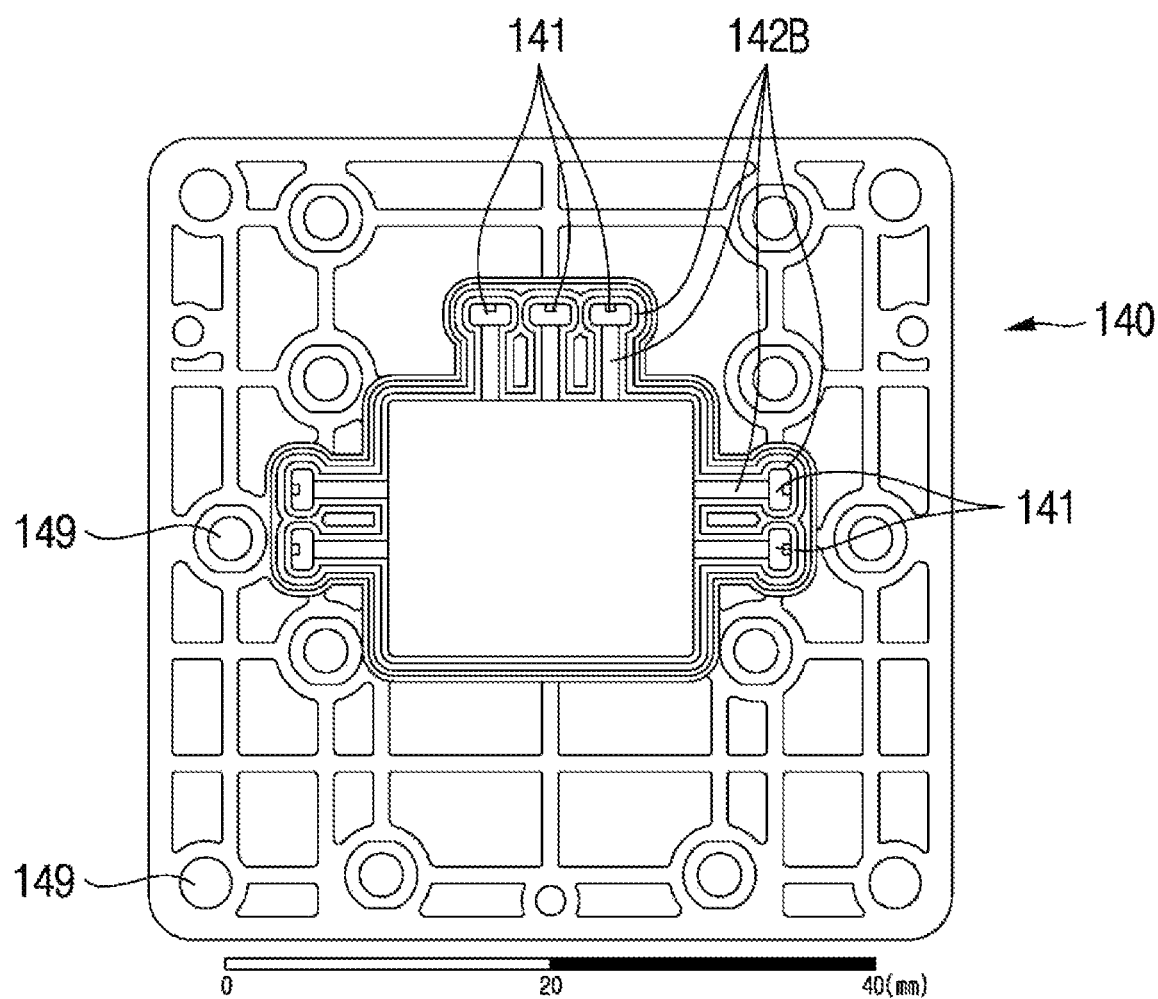

FIGS. 9A and 9B are a top view and bottom view illustrating a conductive sub layer 140 of a multi-layer antenna structure 100 according to an embodiment.

Referring to FIGS. 9A and 9B, according to an embodiment, the conductive sub layer 140 of the multi-layer antenna structure 100 may have a substantially flat upper surface and a substantially flat lower surface and may include waveguides 142 on the upper surface and paths 142B on the lower surface.

According to an embodiment, the waveguides 142 on the upper surface and the paths 142B on the lower surface may be connected through a plurality of feeding holes 141 or RF signal paths passing through the upper surface and lower surface.

According to an embodiment, the lower surface of the conductive sub layer 140 may include an area for receiving the RF integrated circuit 111 provided on the printed circuit board 110, an area for receiving the feeding line 112, and an area for receiving the feeding pad 113. The area for receiving the feeding line 112 and the area for receiving the feeding pad 113 may be denoted as paths 142B for convenience of description.

According to an embodiment, the feeding hole 141 of the conductive sub layer 140 may be provided in an area corresponding to the feeding pad 113 of the printed circuit board 110.

According to an embodiment, the conductive sub layer 140 may include a plurality of rivet holes 149 and may further include guide protrusions 148T fitted into the guide holes 128B formed in the conductive lower layer 120.

Thus, the conductive sub layer 140, the conductive lower layer 120, and the conductive upper layer 130 may be coupled to each other by the guide protrusions 148T, 128T, and 139B, the guide holes 128B and 138B, and the guide recesses 129T and be coupled to each other by riveting, e.g., inserting rivets 150 to the rivet holes 149, 139, 129, and 119. The printed circuit board 110 may also be riveted to the combined structure of the conductive sub layer 140, conductive lower layer 120, and conductive upper layer 130.

Figure 10:
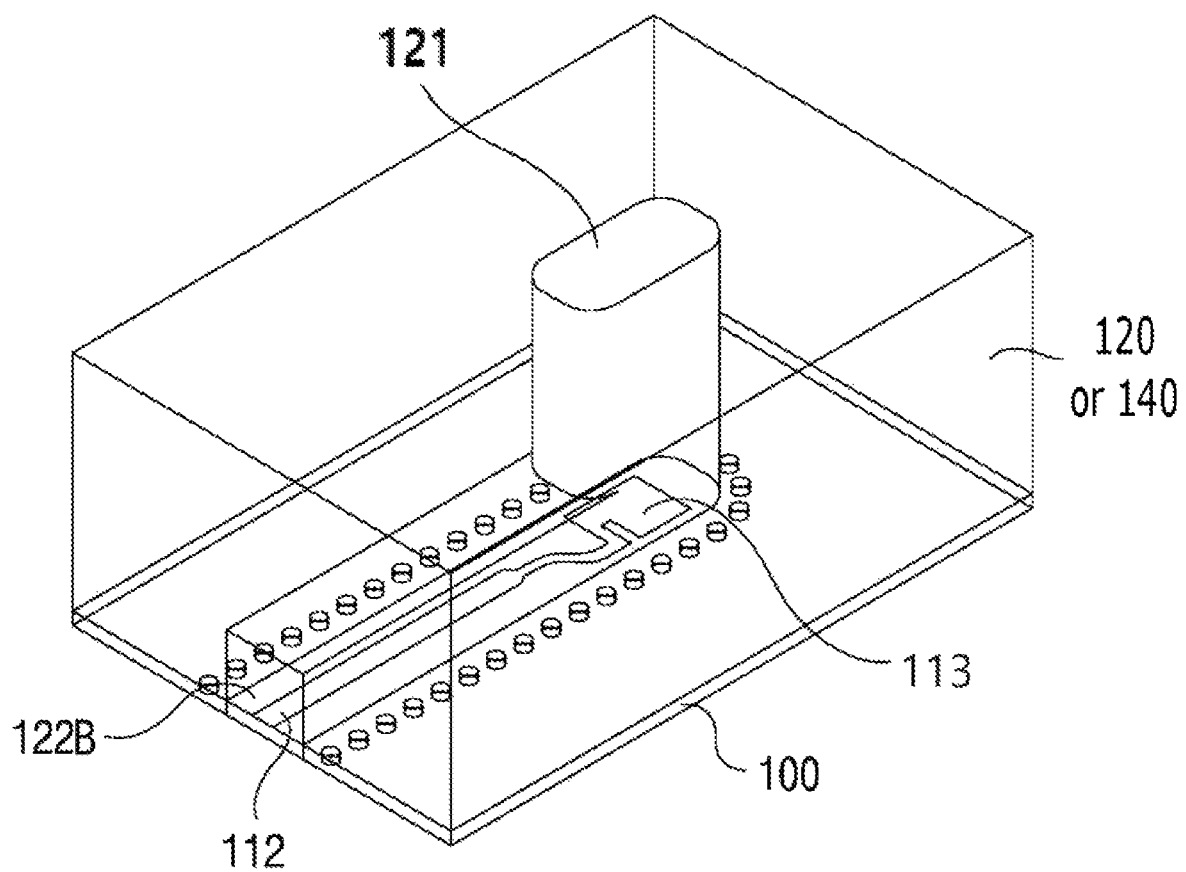
FIG. 10 is a partial perspective view illustrating a relationship between a printed circuit board and a conductive lower layer of a multi-layer antenna structure according to an embodiment.

FIG. 10 is a partial perspective view illustrating a relationship between a printed circuit board 110 and a conductive lower layer 120 of a multi-layer antenna structure 100 according to an embodiment.

According to an embodiment, the conductive lower layer 120 may be the conductive sub layer 140. Referring to FIG. 10, the feeding line 112 and the feeding pad 113 of the printed circuit board 110 may be elongated or extended to be relatively longer in the lengthwise direction thereof.

According to an embodiment, the feeding hole 121 of the conductive lower layer 120 (or conductive sub layer 140) may be elongated or extended to be relatively longer in the lengthwise direction thereof, similar to the feeding line 112 and the feeding pad 113.

The waveguide 122 (or path 142B) and the feeding hole 121 (or feeding hole 141) of the conductive lower layer 120 (or conductive sub layer 140) may be formed in the positions corresponding to the feeding line 112 and feeding pad 113, respectively, of the printed circuit board 110. According to an embodiment, this structure (e.g., the combined structure of the printed circuit board 110, the conductive upper layer 130, the conductive sub layer 140, and the conductive lower layer 120) may include, or be denoted as, a transition structure or an adapter.

Figure 11:
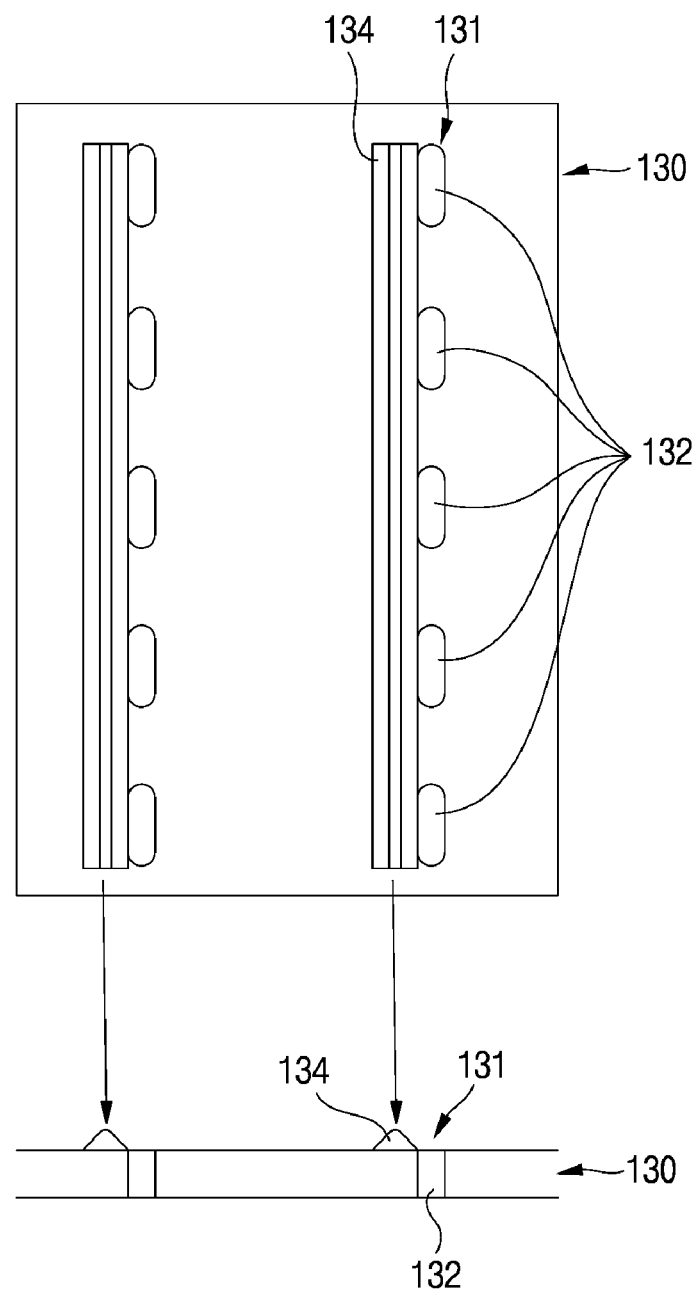
FIG. 11 is a plan view illustrating a conductive upper layer of a multi-layer antenna structure according to an embodiment.

FIG. 11 is a plan view illustrating a conductive upper layer 130 of a multi-layer antenna structure 100 according to an embodiment.

As shown in FIG. 11, the antenna slot pattern 131 of the conductive upper layer 130 may include a row of slot array 132 arranged above the protruding waveguide 122 of the conductive lower layer 120.

According to an embodiment, the conductive upper layer 130 may further include a protruding rib 134 on a side of the row of slot array 132 on the upper surface thereof. According to an embodiment, the protruding rib 134 may protrude by a predetermined height upward from the upper surface of the conductive upper layer 130. According to an embodiment, the protruding rib 134 may have a cross section shaped as a triangle, a rectangle, a trapezoid, a semicircle, or a semioval. The protruding rib 134 may tilt the beam, thereby providing a single array antenna structure without an additional divider.

Figure 12:
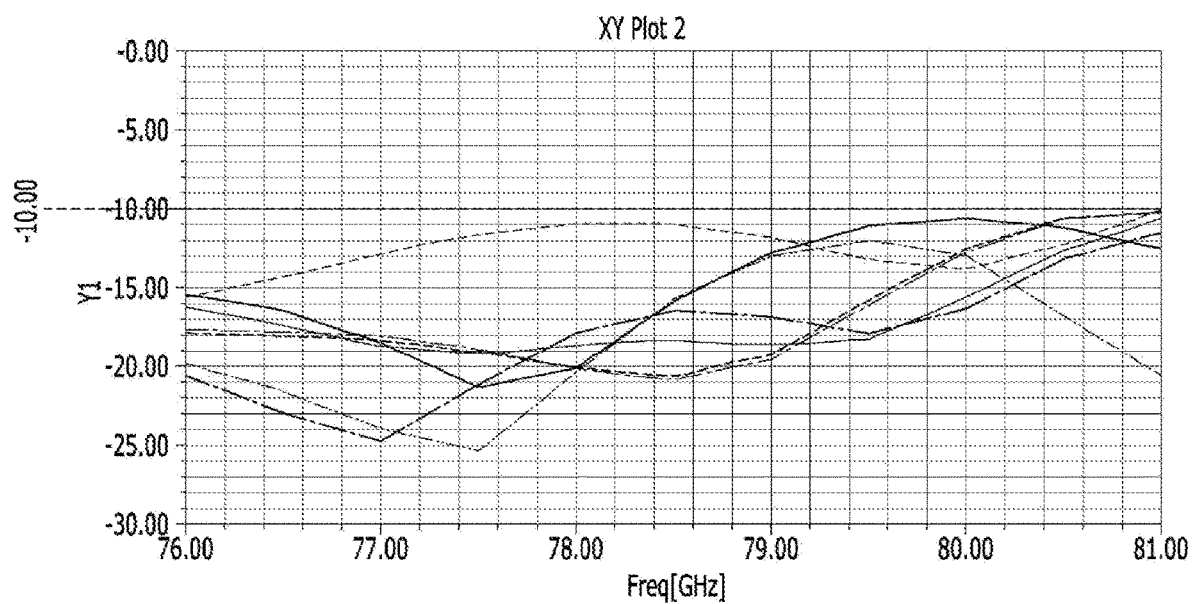
FIG. 12 is a graph illustrating the bandwidth of a multi-layer antenna structure as illustrated in FIG. 6.
Figure 13:
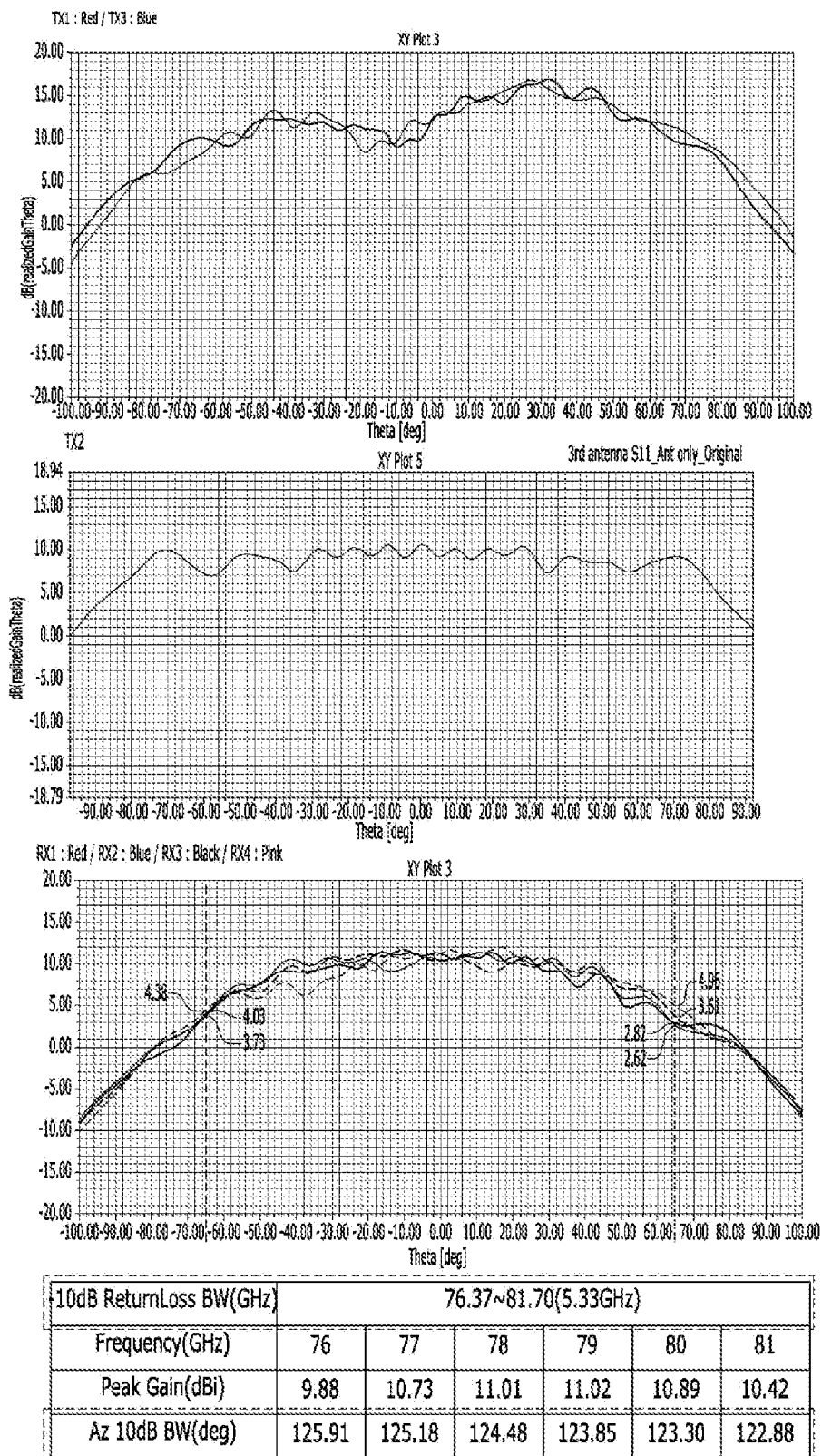
FIG. 13 is a graph illustrating a radiation pattern of a multi-layer antenna structure as illustrated in FIG. 6.

FIG. 12 is a graph illustrating the bandwidth of a multi-layer antenna structure 100 as illustrated in FIG. 6. FIG. 13 is a graph illustrating a radiation pattern of a multi-layer antenna structure 100 as illustrated in FIG. 6.

Referring to FIGS. 12 and 13, according to an embodiment, the multi-layer antenna structure 100 may operate in a range from about 76 GHz to about 81 GHz, e.g., a bandwidth of about 5 GHz, and the beam width of the antenna may be about 150 degrees or more. As such, the multi-layer antenna structure 100 is able to implement both the wide-band characteristic and wide-angle characteristic and be applied to vehicle corner radars.

Figure 14A:
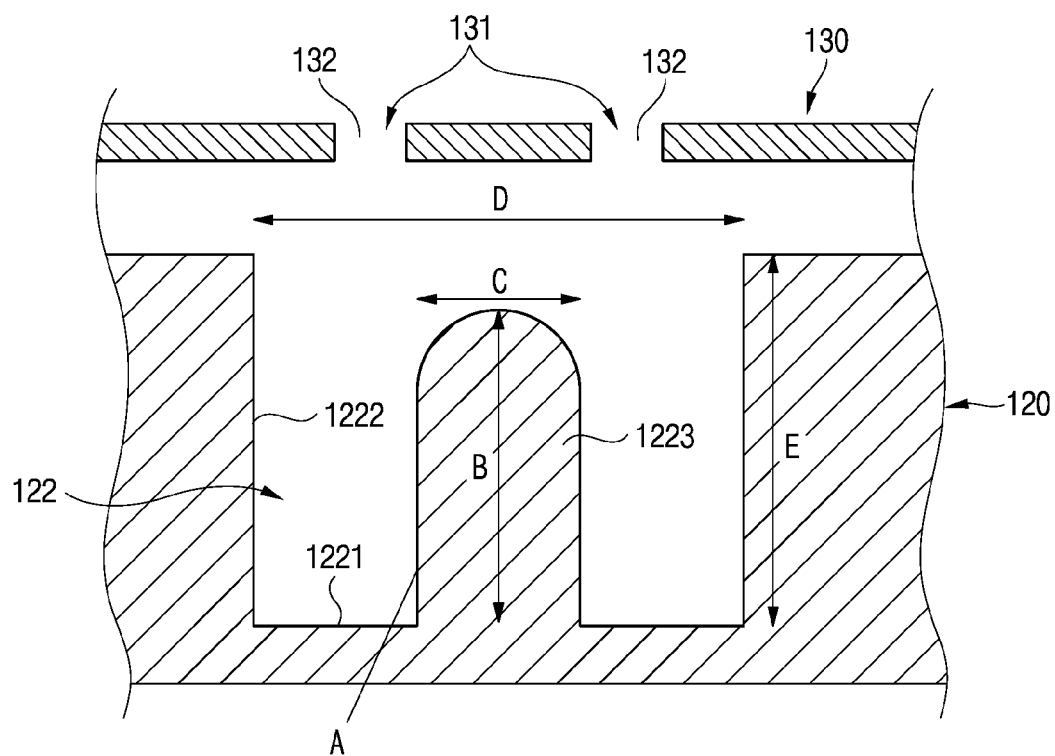
FIGS. 14A and 14B are views illustrating an example of a protruding waveguide having a protrusion, of a multi-layer antenna structure as illustrated in FIG. 6.
Figure 14B:
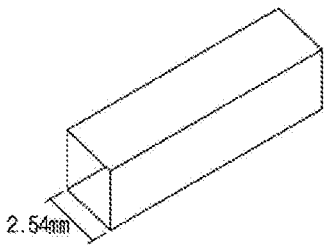
Figure 15:
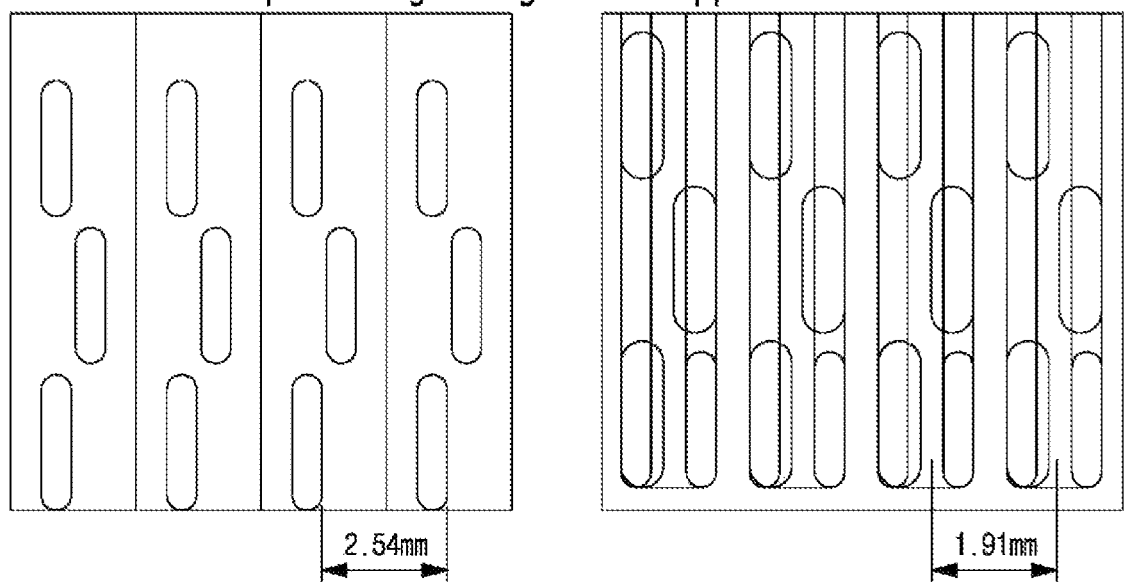
FIG. 15 is a view illustrating comparison in inter-antenna gap between when a hollow waveguide is applied and when a protruding waveguide is applied.
Figure 16:
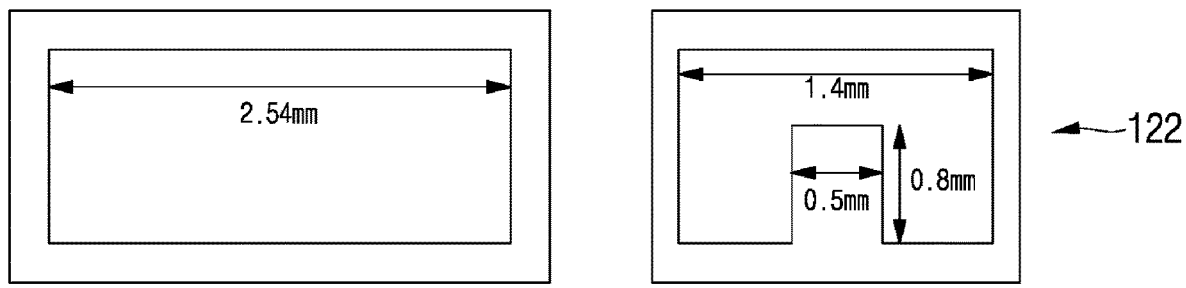
FIG. 16 is a cross-sectional view of FIG. 15.

FIGS. 14A and 14B are views illustrating an example of a protruding waveguide 122 having a protrusion, of a multi-layer antenna structure 100 as illustrated in FIG. 6. FIG. 15 is a view illustrating comparison in inter-antenna gap between when a hollow waveguide is applied and when a protruding waveguide is applied. FIG. 16 is a cross-sectional view of FIG. 15.

Referring to FIG. 14A, the protruding waveguide 122 on the upper surface of the conductive lower layer 120 may include a bottom surface 1221, which is positioned lower than the upper surface, side surfaces 1222, which are connected from two opposite ends of the bottom surface 1221 to the upper surface, and a protrusion 1223, which projects upward from a center of the bottom surface 1221. According to an embodiment, the protrusion 1223 may include, or be denoted as, a protruding portion.

According to an embodiment, the upper end of the protrusion 1223 may have a substantially rounded, rectangular, or triangular shape at cross-sectional view.

According to an embodiment, the overall length along the bottom surface 1221 and the outer circumference of the protrusion 1223 may be half the wavelength of the RF signal, or more.

According to an embodiment, the height B of the protrusion 1223 may be larger than the width C of the protrusion 1223 and be larger than half the depth E of the side surface 1222. In FIG. 14A, D denotes the minimum width of the waveguide 122.

According to an embodiment, the gap between the antennas of the transmitter and/or receiver of the vehicle radar may be the half wavelength with respect to the center frequency of the operating frequency. When a bandwidth of about 5 GHz is required as in the vehicle corner radar, the transmitter and/or receiver antennas may be arranged at every 1.91 mm gap, which is the half wavelength, of the center frequency 78.5 GHz between about 76 GHz and about 81 GHz.

In such a case, a slot array antenna using a conventional hollow waveguide (as shown on the left side of FIGS. 14B, 15, and 16) has a waveguide width of about 2.54 mm which is larger than the half wavelength and thus may not be adopted in vehicle corner radars. However, according to an embodiment, a slot array antenna adopting the protruding waveguide 122 may address such issues.

According to an embodiment, the protruding waveguide 122 may reduce the width of the waveguide up to about 1.4 mm (as shown on the right side of FIG. 14B) and thus may apply about 1.91 mm which is the inter-antenna gap of the transmitter and/or receiver required for vehicle corner radars (as shown on the right side of FIG. 15).

The protruding waveguide 122 may reduce the cutoff frequency of the waveguide by including the protrusion 1223 inside a hollow waveguide and may thus be used in the same band as the hollow waveguide, with a smaller waveguide width.

FIGS. 14B, 15, and 16 illustrate a hollow waveguide on the left side and a protruding waveguide on the right side. As an example, even with a smaller inner width, e.g., about 1.4 mm, the protruding waveguide may operate in an about 70 GHz band like the hollow waveguide shown on the left side of FIG. 15. If a hollow waveguide having a width of about 1.4 mm is used, the cutoff frequency of the waveguide of such a structure is about 107 GHz, which falls out of the band of about 76 GHz to about 81 GHz, which is the operating frequency range of the vehicle radar, and thus, the hollow waveguide may not be operated.

In the protruding waveguide 122, it is possible to change the impedance of the waveguide 122 by adjusting the height and width of the inner protrusion 1223. According to an embodiment, the protrusion 1223 has a height of, e.g., 0.8 mm and a width of, e.g., 0.5 mm, implementing a further reduced size.

Figure 17:
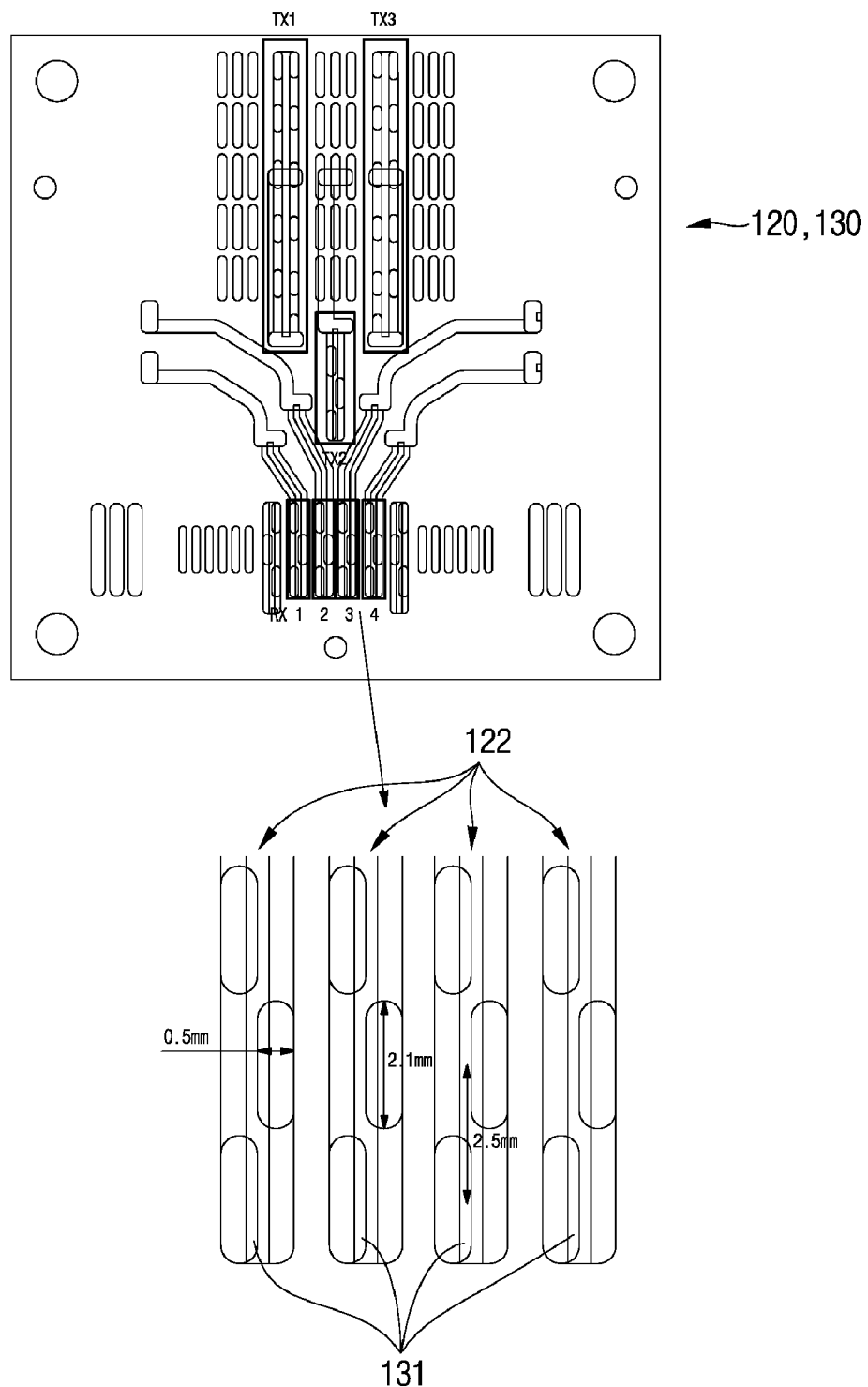
FIG. 17 is a view illustrating a structure of an antenna slot as illustrated in FIG. 6.
Figure 18:
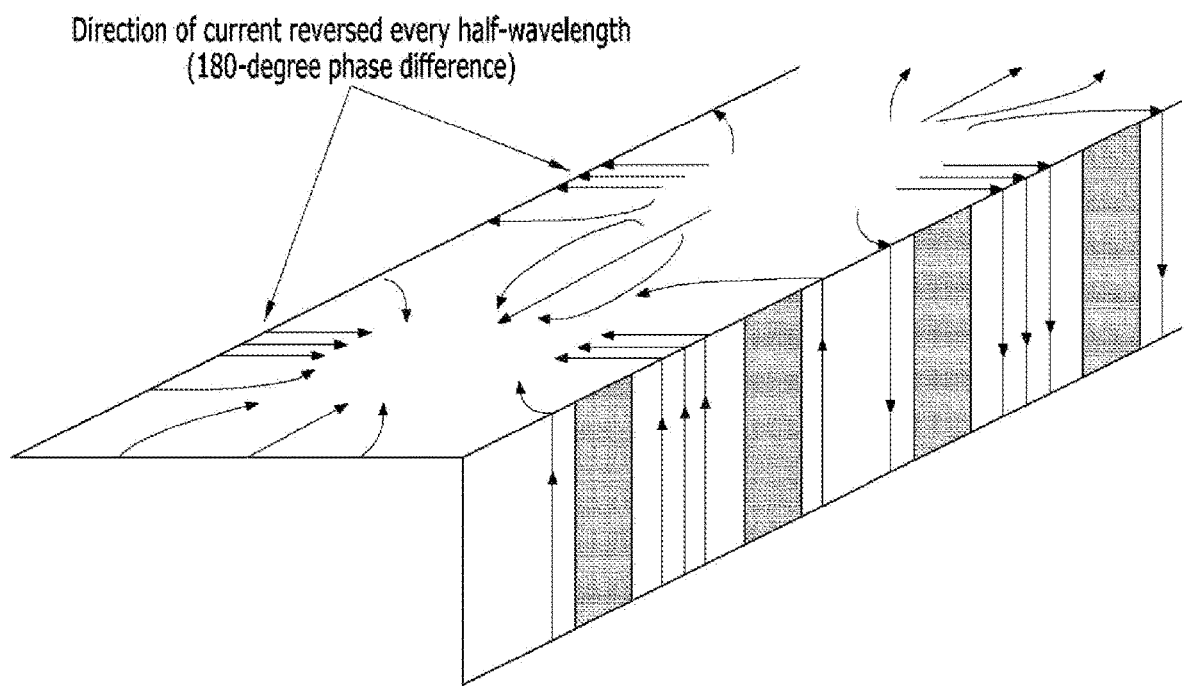
FIG. 18 is a view illustrating a direction of current flowing in a waveguide according to arrangement of antenna slot patterns as illustrated in FIG. 6.

FIG. 17 is a view illustrating a structure of an antenna slot pattern 131 as illustrated in FIG. 6. FIG. 18 is a view illustrating a direction of current flowing in a waveguide according to arrangement of antenna slots as illustrated in FIG. 6. FIG. 17 illustrates the conductive upper layer 130 and the conductive lower layer 120 which overlap each other.

Referring to FIGS. 17 and 18, according to an embodiment, the slot pattern 131 of the multi-layer antenna structure 100 may include a plurality of slots (e.g., slot arrays 132) based on the half wavelength of the internal wavelength of the protruding waveguide 122. In the inside of the protruding waveguide 122, the electromagnetic wave propagates while being reflected on the inner surface of the conductor, and its wavelength thus becomes longer than the wavelength value in free space, so that the length of each slot in the antenna may be provided using the guided wavelength.

According to an embodiment, the guided wavelength of the protruding waveguide 122 may be about 4.8 mm at about 78.5 GHz. This is longer than the wavelength, e.g., about 3.82 mm, in free space. Accordingly, according to the disclosure, the length of the antenna slot may be provided as about 2.3 mm based on the guided wavelength.

Since the width of the antenna slot is about 0.6 mm, so that as the width of the antenna slot increases, it has a wide-band characteristic. Thus, the width of the antenna slot needs to be large to provide a wide-band characteristic. Thus, according to an embodiment, the width of the antenna slot may be about 0.6 mm.

As the direction of the current flowing in the waveguide 122 is reversed every half-wavelength gap of the guided wavelength, the antenna slots may be arranged to be staggered every half-wavelength gap to allow the propagating wave radiated from the antenna slots to be in phase therebetween. For example, the antenna slots of the receiver may be arranged in a zig-zagged pattern.

Figure 19:
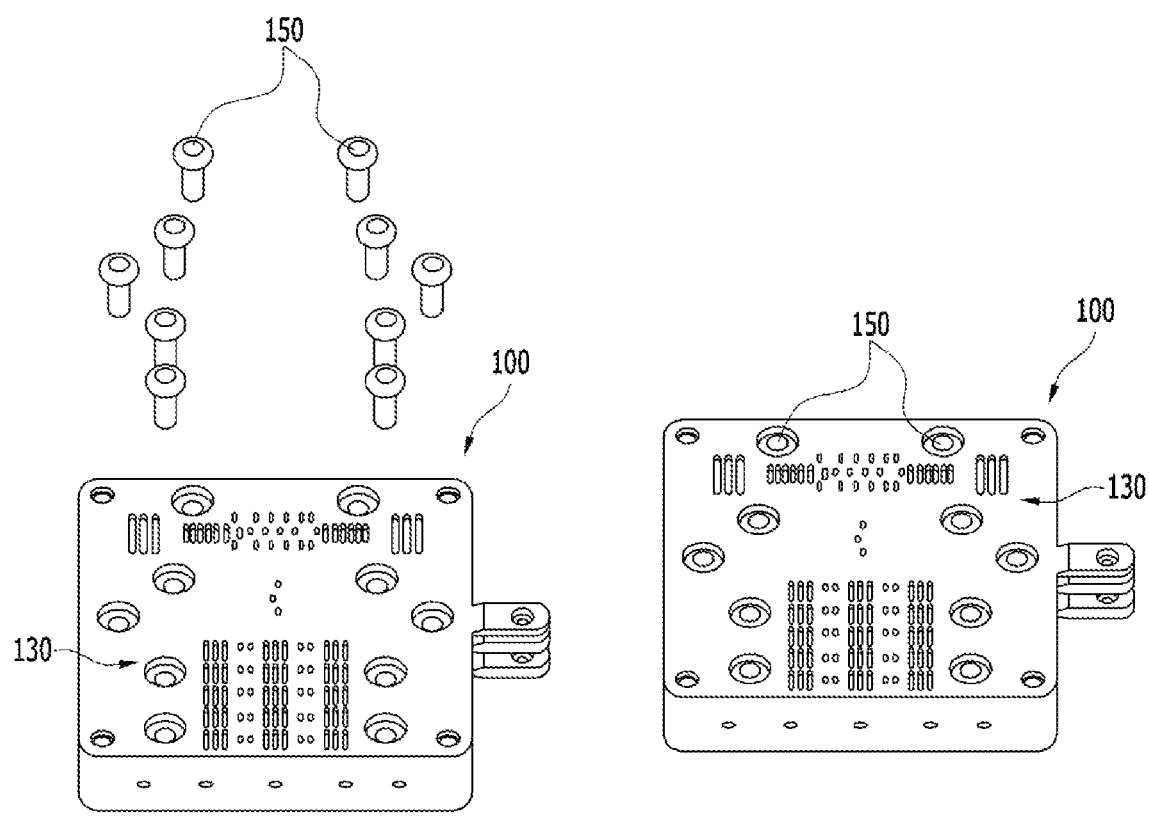
FIG. 19 is a view illustrating an example of fastening an antenna using rivets.

FIG. 19 is a view illustrating an example of fastening a multi-layer antenna structure 100 using rivets. In general, the multi-layer antenna structure 100 may be assembled using screws. However, a deviation in antenna performance may arise depending on the positions of the screws fastened. Further, fastening with screws one by one to manufacture the multi-layer antenna structure 100 may take a long time.

Referring to FIG. 19, according to an embodiment, the multi-layer antenna structure 100 may be assembled by rivets 150. For example, the multi-layer antenna structure 100 may simultaneously be assembled by riveting using a riveting jig, thereby shortening the mass-production time and reducing defects in assembly. If the printed circuit board 110, the conductive lower layer 120, the conductive upper layer 130, and/or the conductive sub layer 140 are less tightly fastened to each other, a current leak may occur in the connecting area of the printed circuit board 110 or between the layers, degrading the characteristics of the product. According to an embodiment, as the multiple layers are fastened by riveting, it is possible to prevent such degradation of characteristics.

As described above, the printed circuit board 110, the conductive sub layer 140, the conductive lower layer 120, and the conductive upper layer 130 may include rivet holes 119, 149, 129, and 139 into which rivets 150 are to be inserted, and may be joined together by inserting the rivets 150 into the rivet holes.

According to an embodiment, the conductive sub layer 140, the conductive lower layer 120, and the conductive upper layer 130 may be riveted into one structure, and the structure may be riveted with the printed circuit board 110.

Accordingly, according to an embodiment, it is possible to provide a multi-layer antenna structure 100, e.g., a radar, which may meet both the wide-band characteristic and wide-angle characteristic. Further, according to an embodiment, the printed circuit board 110 and the remaining antenna structure (e.g., the conductive sub layer 140, the conductive lower layer 120, and the conductive upper layer 130) may be provided as separate components, so that each may be individually tested before assembly. Thus, it is possible to provide a multi-layer antenna structure 100 with a reduced defect rate upon mass-production. Further, according to an embodiment, the antenna structure 100 may be manufactured by plastic molding and conductor plating, thereby providing a multi-layer antenna structure 100 with a reduced manufacturing tolerance. Further, according to an embodiment, it is possible to provide a multi-layer antenna structure 100 with a performance enhancement of about 125% vertically and about 312% horizontally in bandwidth, and a performance enhancement of about 149% vertically and about 121% horizontally in AZ FOV.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A multi-layer antenna structure supporting a wide band and a wide angle, comprising:
  a printed circuit board including an integrated circuit (IC) for processing a radio frequency (RF) signal, a feeding line connected to the IC, and a feeding pad connected to the feeding line to transfer the RF signal;
  a conductive lower layer tightly contacting the printed circuit board and including a feeding hole provided in an area connected with the feeding pad of the printed circuit board and vertically open and a waveguide connected to the feeding hole and disposed on an upper surface of the conductive lower layer; and
  a conductive upper layer tightly contacting the conductive lower layer and including an antenna slot pattern provided in an area corresponding to the waveguide of the conductive lower layer and vertically open to radiate or receive the RF signal, wherein the waveguide of the conductive lower layer includes a bottom surface positioned lower than an upper surface thereof, a side surface extending from each of two opposite ends of the bottom surface to the upper surface, and a protrusion protruding upward from a center portion of the bottom surface.

2. The multi-layer antenna structure of claim 1, wherein an overall length along the bottom surface and an outer circumference of the protrusion is not less than a half wavelength of the RF signal.

3. The multi-layer antenna structure of claim 1, wherein a height of the protrusion is larger than a width of the protrusion and is larger than half of a depth of the side surface.

4. The multi-layer antenna structure of claim 1, wherein each of the conductive upper layer and the conductive lower layer includes an insulating body formed by plastic injection molding and a conductive layer coated on a surface of the insulating body.

5. The multi-layer antenna structure of claim 1, wherein the conductive upper layer is thinner than the conductive lower layer.

6. The multi-layer antenna structure of claim 1, further comprising a conductive sub layer interposed between the printed circuit board and the conductive upper layer to provide a path of the RF signal between the feeding pad of the printed circuit board and the feeding hole of the conductive lower layer.

7. The multi-layer antenna structure of claim 1, wherein the feeding pad of the printed circuit board and the feeding hole of the conductive lower layer are elongated in a lengthwise direction of the feeding line of the printed circuit board.

8. The multi-layer antenna structure of claim 1, wherein the antenna slot pattern of the conductive upper layer includes at least two rows of slot arrays, and wherein the at least two rows of slot arrays include a first row of slot array and a second row of slot array which have different slot lengths, or slots in the at least two rows of slot arrays are arranged in a zig-zagged pattern.

9. The multi-layer antenna structure of claim 1, wherein the antenna slot pattern of the conductive upper layer includes a row of slot array disposed at an upper portion of the conductive lower layer, and wherein the conductive upper layer further includes a protruding rib on a side of the row of slot array on the upper surface thereof.

10. The multi-layer antenna structure of claim 1, wherein the printed circuit board, the conductive lower layer, and the conductive upper layer are coupled to each other by fitting a guide protrusion into a guide hole, and wherein the printed circuit board, the conductive lower layer, and the conductive upper layer each include a rivet hole into which a rivet is inserted and are coupled to each other by riveting.

11. The multi-layer antenna structure of claim 1, wherein the conductive upper layer further includes an adjacent slot pattern vertically open or cut around the antenna slot pattern.

* * * * *